US006996371B2

(12) United States Patent
Delabbaye et al.

(10) Patent No.: US 6,996,371 B2
(45) Date of Patent: Feb. 7, 2006

(54) DEVICE FOR THE ANALYSIS OF ELECTROMAGNETIC SIGNALS

(75) Inventors: Jean-Yves Delabbaye, Vieille-Eglise-en-Yvelines (FR); André Couderette, Montigny-le-Bretonneux (FR)

(73) Assignee: Thales, Paris (FR)

( * ) Notice: Subject to any disclaimer, the term of this patent is extended or adjusted under 35 U.S.C. 154(b) by 910 days.

(21) Appl. No.: 09/900,181

(22) Filed: Jul. 9, 2001

(65) Prior Publication Data

US 2002/0039887 A1   Apr. 4, 2002

(30) Foreign Application Priority Data

Jul. 12, 2000  (FR) ................................. 00 09131

(51) Int. Cl.
    H04B 7/00    (2006.01)
    H04B 17/00    (2006.01)
    H03K 7/06    (2006.01)
    H03K 9/06    (2006.01)
    H04L 27/00    (2006.01)
(52) U.S. Cl. .................... 455/42; 370/204; 370/205; 375/259; 375/271; 375/322; 455/67.14; 455/67.16
(58) Field of Classification Search ................ 375/259, 375/261, 268, 271, 316, 320, 322, 340; 455/42, 455/43, 44, 45, 67.11, 67.12, 67.13, 67.14, 455/67.15, 67.16; 370/203, 204, 205
See application file for complete search history.

(56) References Cited

U.S. PATENT DOCUMENTS

| | | | | |
|---|---|---|---|---|
| 5,490,177 A | * | 2/1996 | La Rosa et al. | 375/329 |
| 5,633,893 A | * | 5/1997 | Lampe et al. | 375/297 |
| 6,452,958 B1 | * | 9/2002 | van Nee | 375/130 |
| 6,677,900 B1 | * | 1/2004 | Thouvenel et al. | 342/464 |
| 6,754,260 B1 | * | 6/2004 | Itahara et al. | 375/224 |

OTHER PUBLICATIONS

N. M. Marinovich†, et al., "Classification Of Digital Modulation Types", Proceeding of the Spie, vol. 2563, Jul. 10, 1995, pp. 125-143.
K. C. Ho, et al., "Modulation Identification By The Wavelet Transform", Milcom Conference Record, vol. 2, Nov. 6, 1995, pp. 886-890.
Peter A.J. Nagy, "Modulation Classification—An Unified View", Signal Processing, Theories and Applications, Proceedings of Eusipco, vol. 2, 1996, pp. 831-834.

* cited by examiner

Primary Examiner—Harry S. Hong
(74) Attorney, Agent, or Firm—Oblon, Spivak, McClelland, Maier & Neustadt, P.C.

(57) ABSTRACT

The invention relates to a device for aiding the analysis of signals by using symbols-based digital modulation. The device includes a signal memory for storing a complex digital signal, representative in amplitude and phase of a captured signal, over a chosen duration, as well as a processor for searching for the properties relating to the carrier frequency of the complex signal and to its modulation. According to the invention, the processor includes a projector for calculating the components of the complex signal in a function basis, the function basis being parameterized according to an estimated tempo of the modulation, as well as a calculator, operating on these components so as to determine an estimate relating to a property of the complex signal, from among its elementary pulse shape, the string of symbols of the complex signal and its carrier.

21 Claims, 11 Drawing Sheets

Sliding window of width $2\Delta f$

Eliminated part

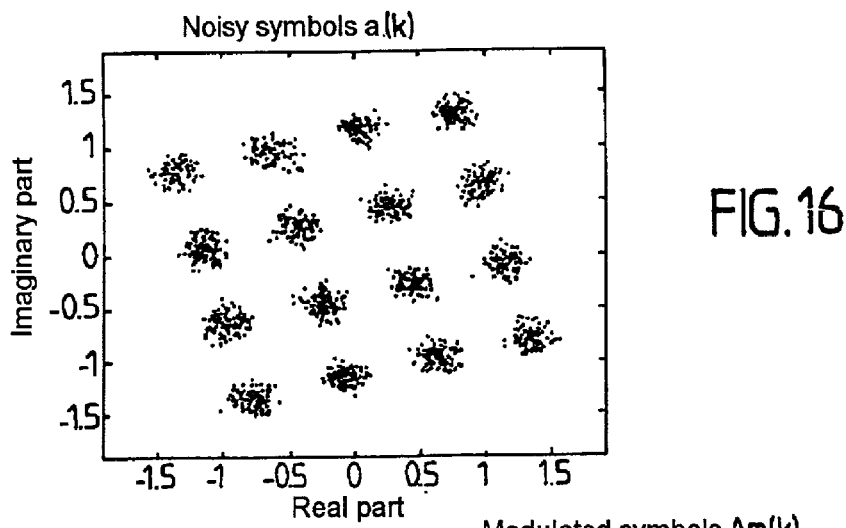
FIG. 16
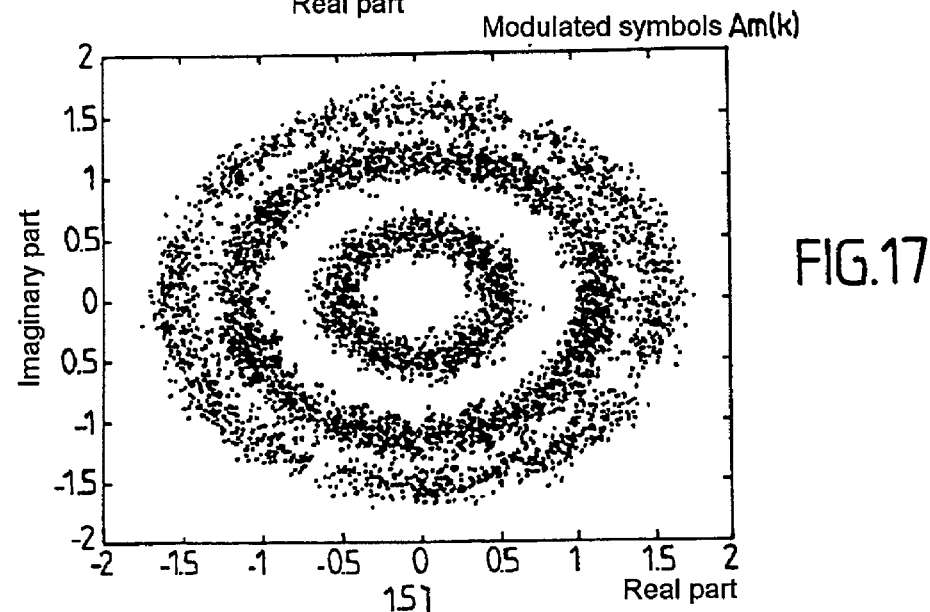
FIG. 17
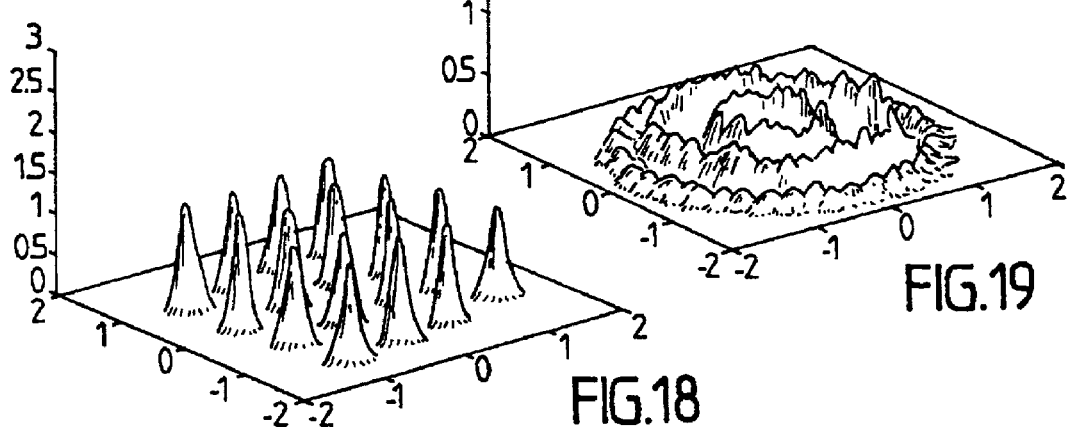
FIG. 18
FIG. 19

DEVICE FOR THE ANALYSIS OF ELECTROMAGNETIC SIGNALS

FIELD OF THE INVENTION

The invention relates to the analysis of electromagnetic signals which are a prior unknown.

In general, one is aware of how to convert a received electromagnetic signal ("real signal") into a complex signal, representative in amplitude and phase of the electromagnetic signal received. This is done in practice after having reduced the frequency, so as generally to drop down to baseband. The complex signal possesses two components, one in phase and the other in quadrature, in the manner of complex numbers, hence its name.

PRIOR ART

The techniques currently available for the analysis of unknown signals consist in searching within the signal received for the invariant attributes, by frequency translation or level translation, in particular. They may involve a Fourier transformation, or else a transformation of the "wavelet" type, or else a WIGNER-VILLE transformation, for example.

Although the state of the art is difficult to perceive exactly as regards the subject-matter, Applicants currently regard it as known practice to search for an estimate of the mean of the "instantaneous frequency", and to perform a demodulation of the signal via this frequency. This could be used in the implementation of the invention.

OBJECTS OF THE INVENTION

Applicants have set themselves the problem of obtaining means which aid in the finding of the message contained in a signal, or even make it possible to find this message completely, when nothing is known regarding the exact modulation and the alphabet of symbols used on transmission, when for example the modulation is digital.

SUMMARY OF THE INVENTION

Applicants have concentrated on certain general types of modulation, in particular on linear digital modulation, for which types they have found solutions, which are the constituent elements of the present invention.

The invention therefore pertains, in particular, to a device for aiding the analysis of signals containing a symbols-based digital modulation. This device comprises:
  a signal memory, for storing a complex digital signal ($z(t)$), representative in amplitude and phase of a captured signal, over a chosen duration, and
  processing means, devised to search within the complex signal for the properties relating to its carrier frequency and to the modulation of the carrier frequency as a function of a linear modulation model.

According to the invention the processing means comprise:
  means for determining an estimate of the tempo ($1/T$) of the modulation;
  projection means effective to calculate the components ($zp(k)$) of the complex signal in a function basis ($\phi I(t)$) which is parametrized according to the said tempo ($1/T$) of the modulation;
  and calculation means, operating on these components so as to determine at least one estimate relating to at least one property of the complex signal, within the group of properties comprising the elementary pulse shape ($g(t)$) of the complex signal, the string of symbols ($a(k)$) of the complex signal and the carrier f0 used.

Advantageously the function basis is parametrized so as to exhibit at least two samples per period (T) of the modulation, and more generally q samples per period ($q \in N$ and $q \geq 2$);

More advantageously the function basis comprises at least two functions ($\phi 1(t), \ldots, \phi b(t)$) which are deduced from one another by a temporal translation of chosen period (T/2 or more generally T/q, $q \in N$ and $q \geq 2$);

Still more advantageously the function basis can be based in particular on rectangular functions which are temporally adjacent to one another, or else on functions of the "raised cosine" type.

In a currently preferred embodiment, the projection means comprise:
  means defining a digital filter, having an impulse response substantially equal to one of the said functions, said digital filter receiving the complex signal, and
  sampling means for effecting repeated digital sampling of the output of this filter at a chosen rate (2/T; q/T, $q \in N$ and $q \geq 2$), depending on the type of basis chosen.

According to another aspect of the invention, the processing means are devised to determine an approximate estimate fa of the carrier frequency f0 of the complex signal, as well as to demodulate this complex signal through this estimate fa. The projection means are devised so as to operate on the complex signal ($z(t)$) after demodulation thereof through this approximate estimate, while the said function basis is of low frequency, substantially like the spectrum of the complex signal which, after demodulation, is also low frequency.

According to yet another aspect of the invention, the calculation means comprise means of matrix calculation on the said components.

Preferably, a particular solution for the pair of unknowns ($gp(t)$, $a(k)$) of the model of the signal after projection is firstly calculated in the form of a function of minimal support ($hpm(t)$), together with a symbol train ($cm(k)$). From this residual may be derived a filtering residual ($\alpha i$), which, associated with the pulse shape of minimal support, will yield an estimate of $g(t)$. It will be seen that the symbols ($a(k)$) of the initial signal can subsequently be derived therefrom.

DETAILED DESCRIPTION OF THE DRAWINGS

Expressed hereinabove in device terms, the invention can also be defined in the form of processes.

Other characteristics and advantages of the invention will become apparent on examining the following detailed description, as well as the accompanying drawings, in which:

FIG. 1 schematically illustrates, in block diagram form, the principle of switching to a complex signal (100);

FIG. 1A schematically illustrates a first embodiment making it possible to implement the principle of switching to a complex signal of FIG. 1;

FIG. 1B schematically illustrates a second embodiment making it possible to implement the principle of switching to a complex signal of FIG. 1;

Figure 4A:
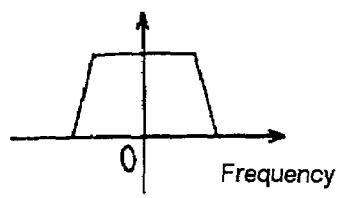
Figure 4B:
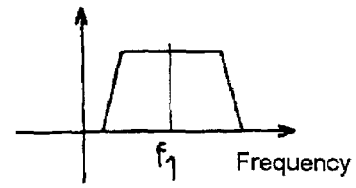
Figure 4C:
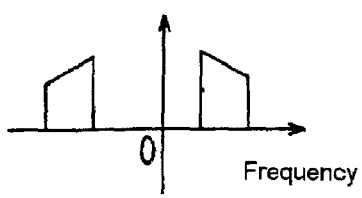
Figure 4D:
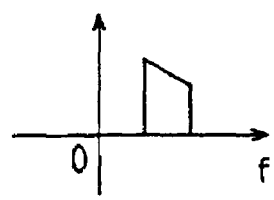
Figure 5A:
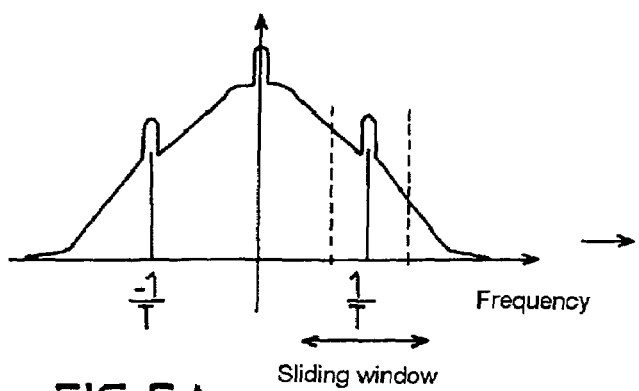
Figure 5B:
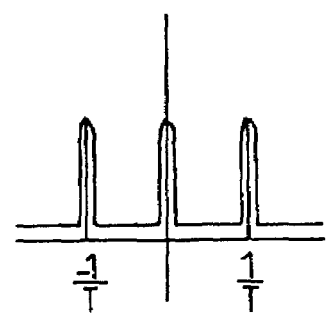
Figure 5C:
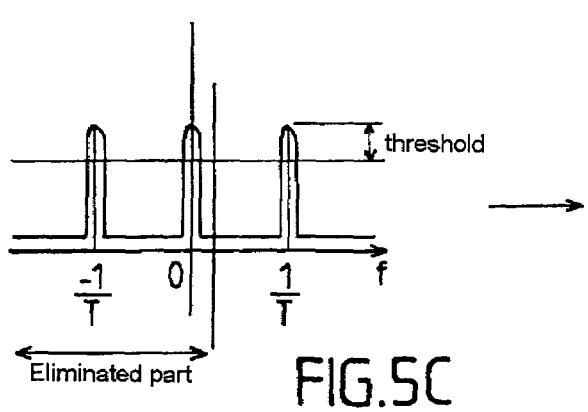
Figure 5D:
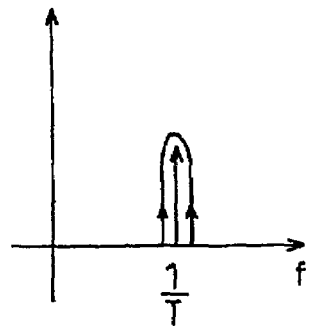
Figure 6:
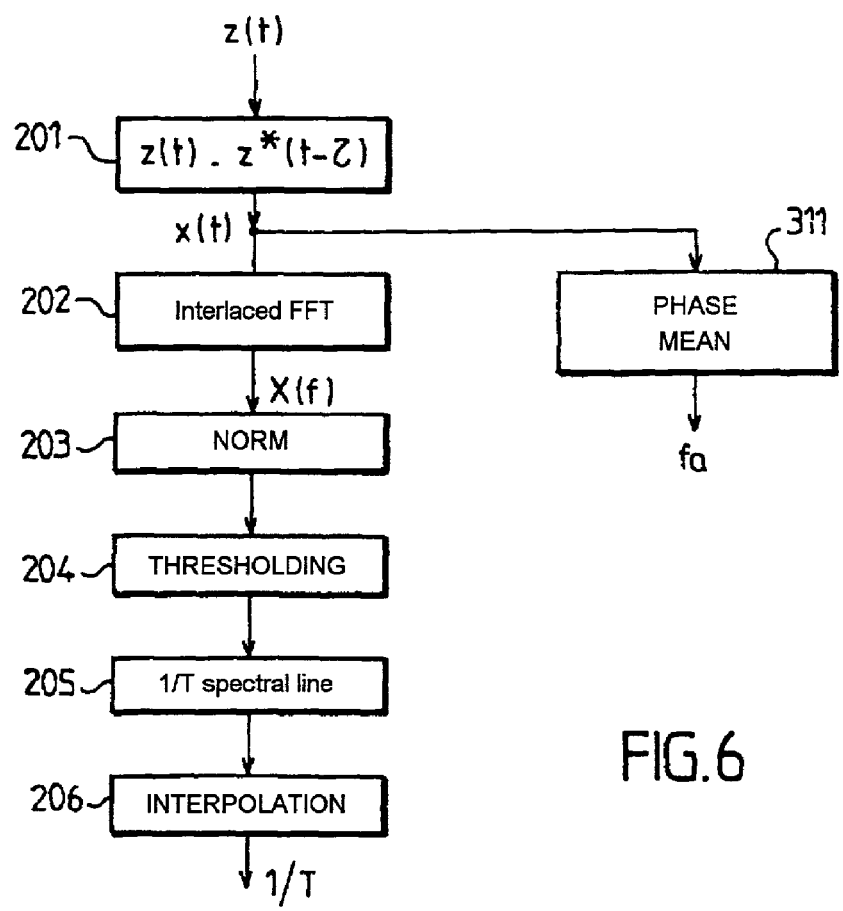
Figure 7A:
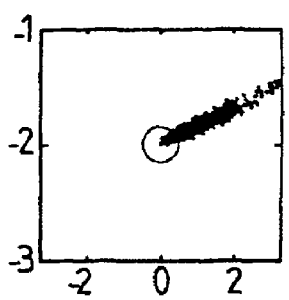
Figure 7B:
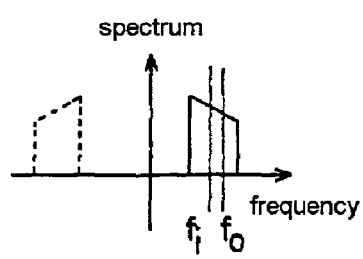
Figure 7C:
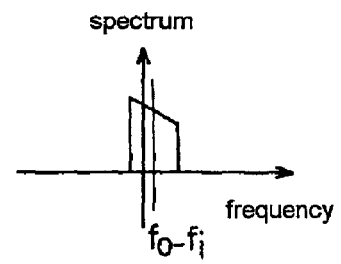
Figure 7D:
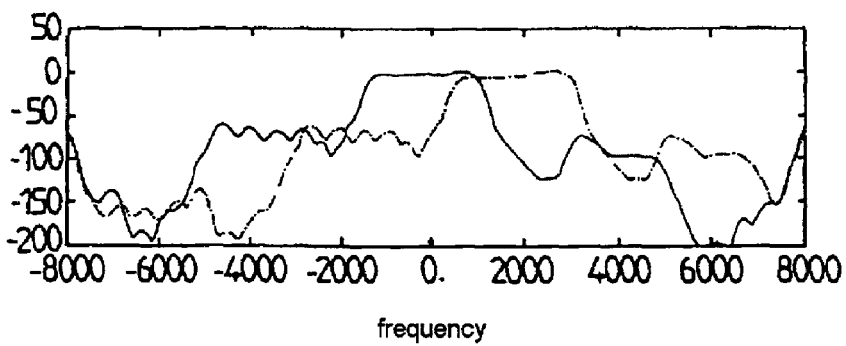
Figure 8A:
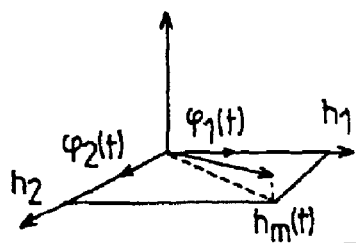
Figure 8B:
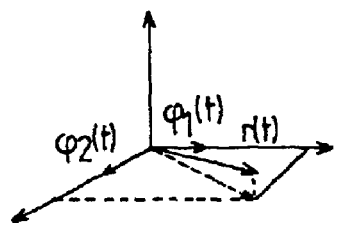
Figure 8C:
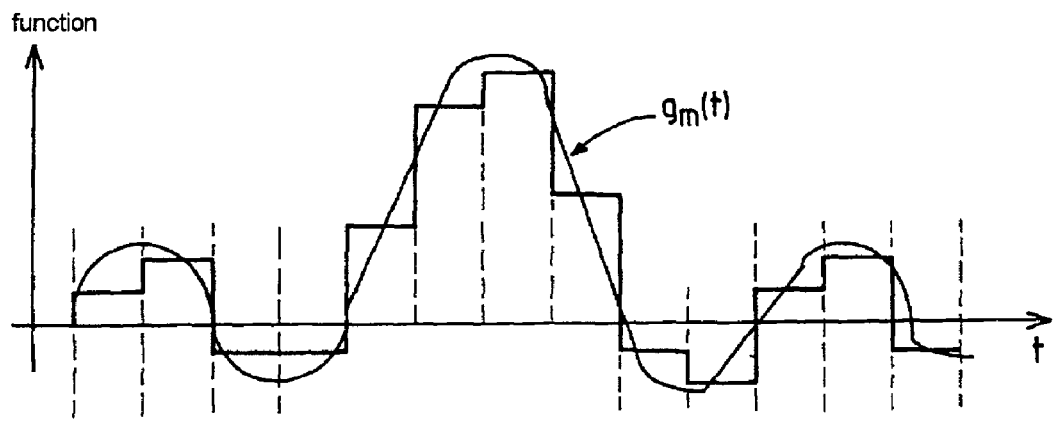
Figure 10A:
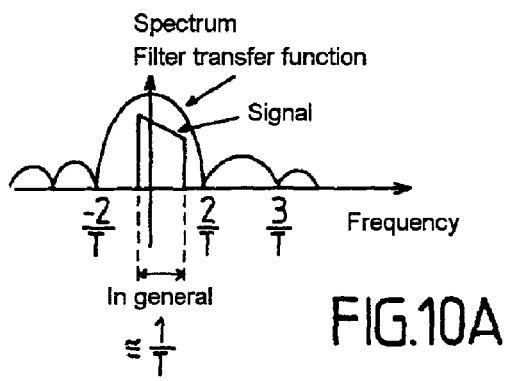
Figure 10B:
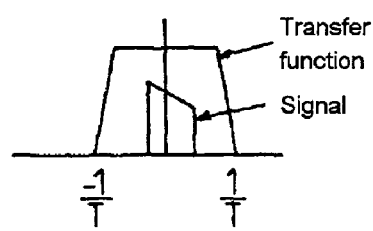
Figure 10C:
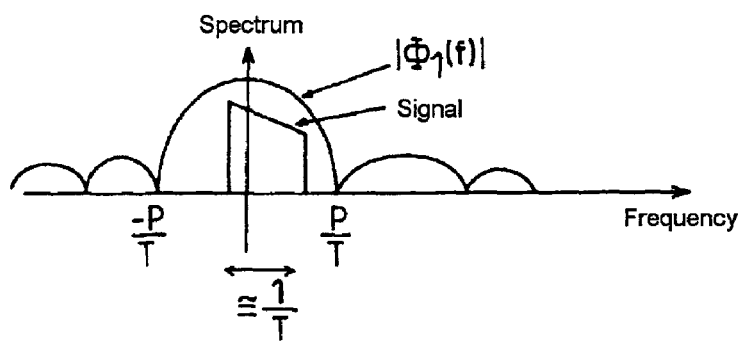
Figure 9:
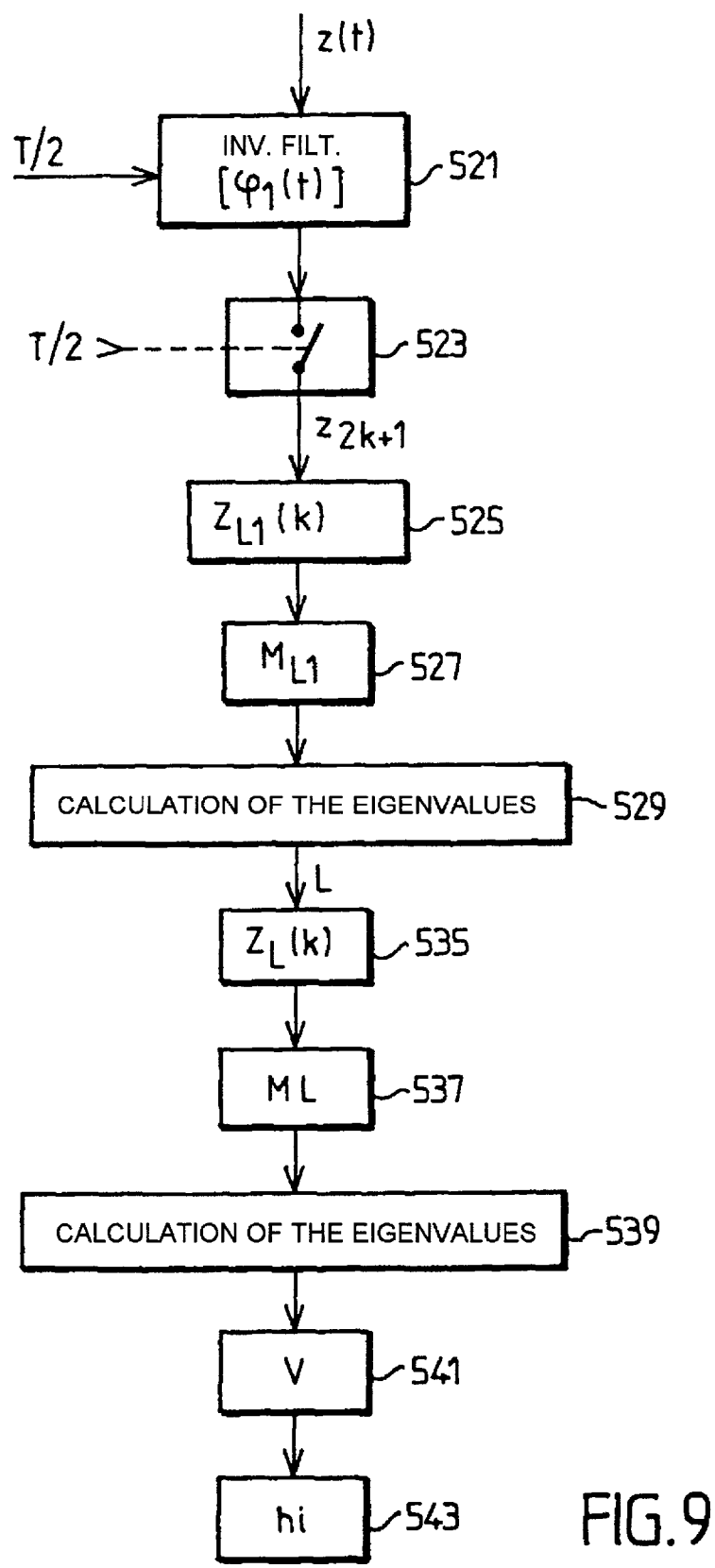
Figure 11:
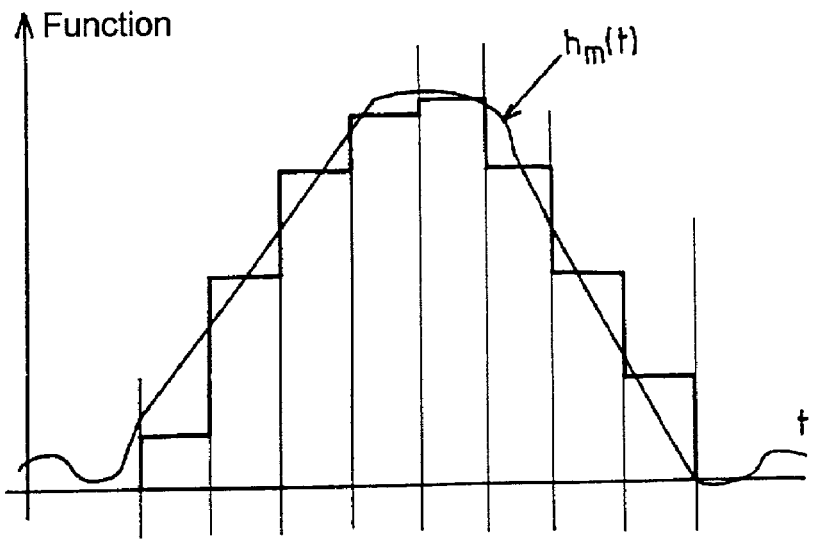
Figure 12:
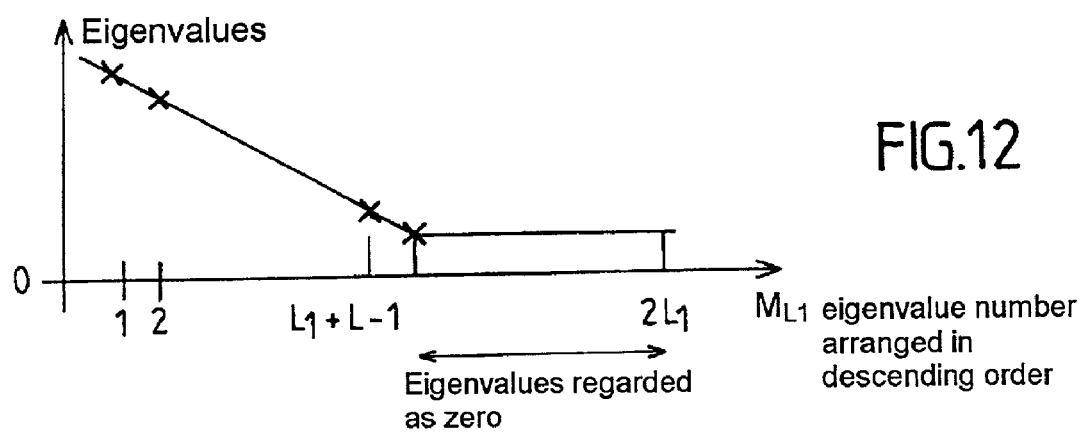
Figure 13:
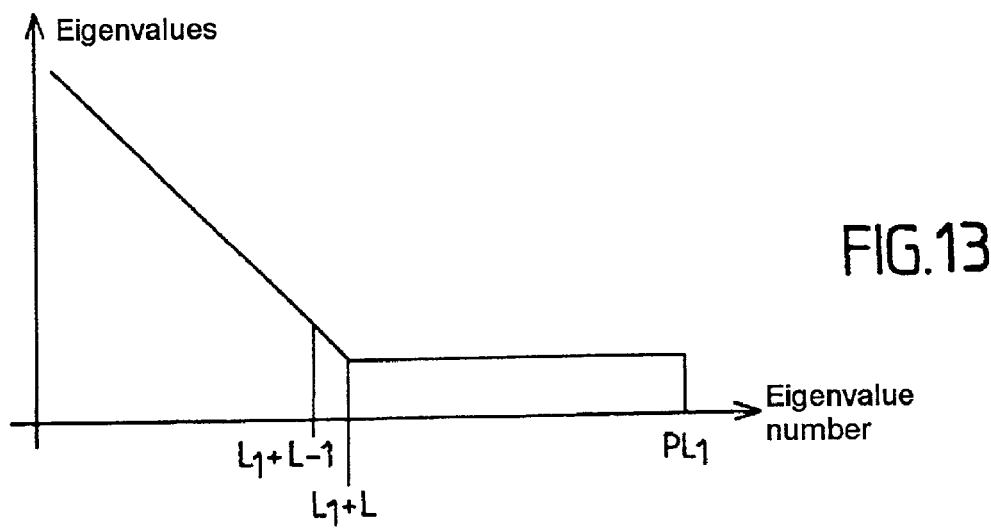
Figure 14A:
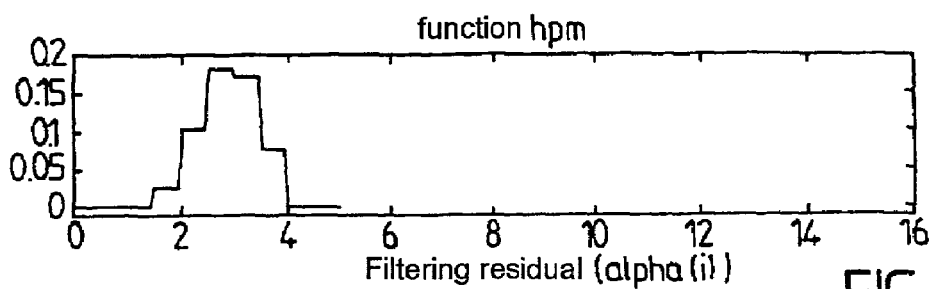
Figure 14B:
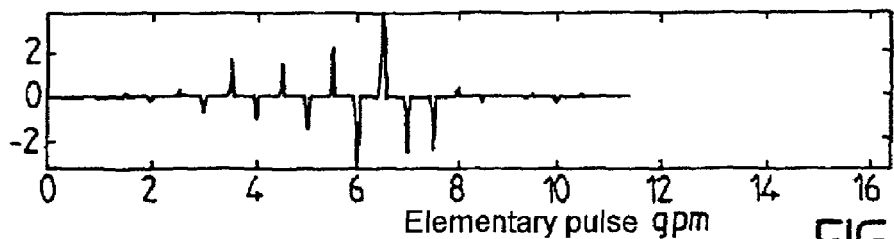
Figure 14C:
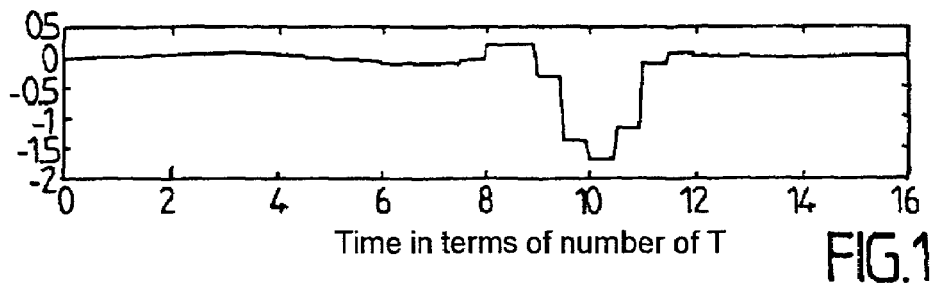
Figure 15:
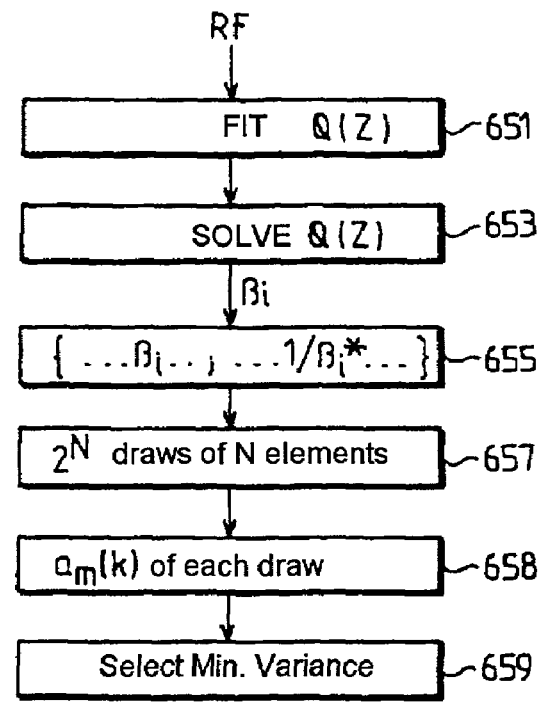
Figure 20:
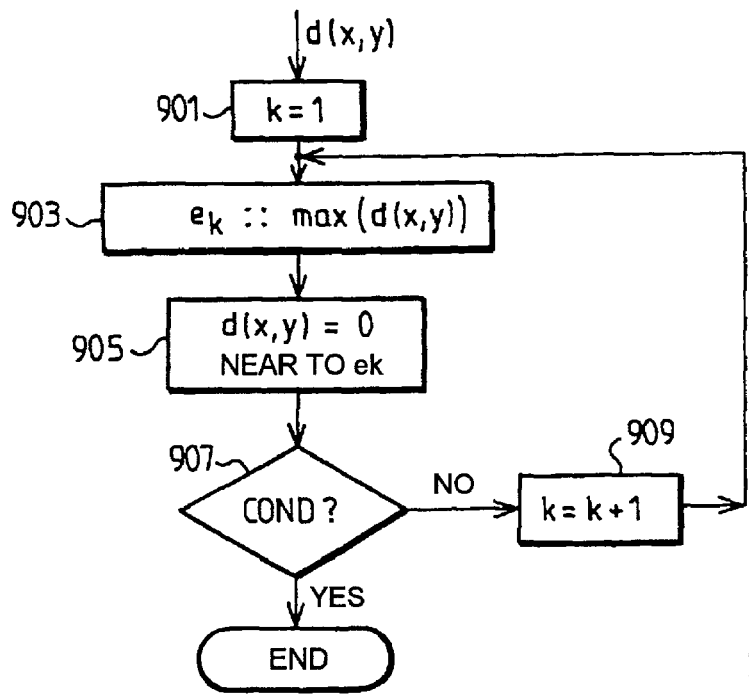
Figure 21:
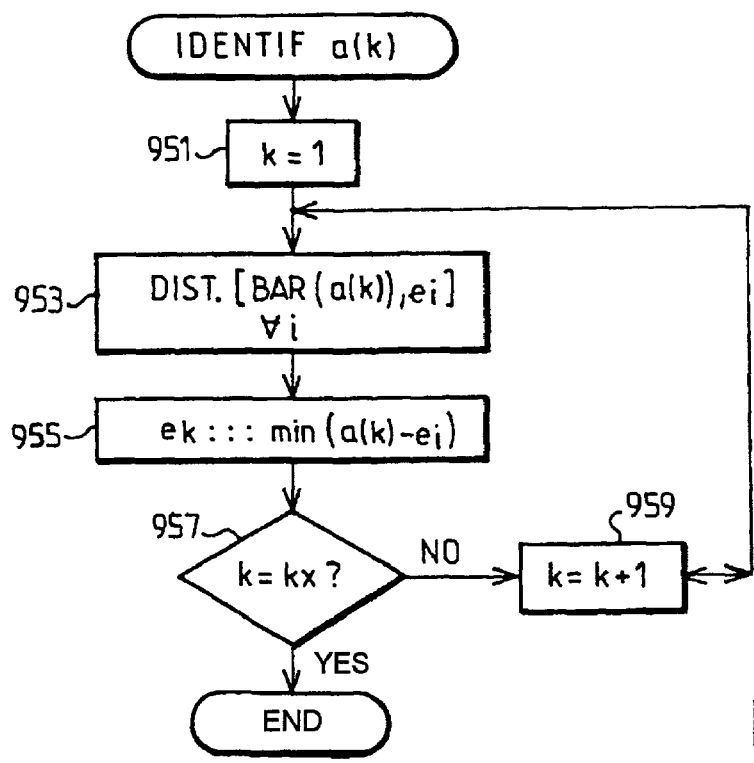

FIGS. 4A to 4D respectively illustrate an impulse response of a conventional real low-pass filter, a transfer function of the filter of FIG. 4A, an input signal spectrum, and the spectrum of the complex signal of the filter having the transfer function of FIG. 4B;

FIGS. 5A to 5D respectively illustrate the spectrum of a signal obtained from a Fast Fourier Transform (FFT), a nonlinear filtering of the output of the FFT of FIG. 5A, an example of the processing of the spectral lines of FIG. 5B, and an example of estimating the spectral line at +1/T of FIG. 5C;

FIG. 6 illustrates in step form an example of processing making it possible to obtain the value 1/T of the isolated spectral line of FIG. 5D;

FIGS. 7A to 7D respectively illustrate an example of a signal defined by a scatter of points in the complex plane, the spectrum of the complex signal of FIG. 7A, the spectrum of the complex signal of FIG. 7B after demodulation, and the spectral density of the signal of FIG. 7A before and after demodulation;

FIGS. 8A and 8B respectively illustrate the projections of hm and of the signal in a chosen function basis;

FIG. 8C illustrates an approximation of the functions gm(t) in the function basis chosen in FIGS. 8A and 8B;

FIG. 9 illustrates in steps form an example of the carrying out of the processing operations aimed at estimating hm(t);

FIGS. 10A to 10C respectively illustrate the spectrum of the transfer function of the impulse response filter for a centred signal of the type of that of FIG. 7C and for a first type of basis, the spectrum of the transfer function of raised cosine functions φ, and the spectrum of the transfer function of the impulse response filter corresponding to FIG. 10B;

FIG. 11 illustrates the approximation of hm(t) by its projection hpm(t) in the function basis of FIG. 10C;

FIG. 12 illustrates the distribution of the eigenvalues of the matrix ML1, arranged in descending order of magnitude along the abscissa, when the projection corresponds to a filtering followed by a sampling with q=2 points per symbol;

FIG. 13 illustrates the distribution of the eigenvalues of the matrix ML1, arranged in descending order of magnitude along the abscissa, when the projection corresponds to a filtering followed by a sampling with q>2 points per symbol;

FIGS. 14A to 14C respectively illustrate, as a function of time expressed in periods T, the function hpm(t), the filtering residual, and the modulated elementary modulation function gpm(t);

FIG. 15 illustrates in steps form an example of the carrying out of the processing operations aimed at estimating the symbols am(k) from the possible symbol trains;

FIG. 16 illustrates an example of dispersion owing to the noise of the symbols a(k), in the complex plane and for a well-centred frequency span (frequency residual);

FIG. 17 illustrates a second example of dispersion owing to the noise of the symbols a(k), in the complex plane and for a poorly centred frequency span;

FIG. 18 is a three-dimensional representation of the probability density of the symbols a(k) of FIG. 16;

FIG. 19 is a three-dimensional representation of the probability density of the symbols a(k) of FIG. 17;

FIG. 20 illustrates in steps form an example of the carrying out of the processing operations aimed at estimating the position of the possible states; and FIG. 21 illustrates in steps form an example of the carrying out of the processing operations aimed at estimating the string of symbols actually transmitted, from the train of noisy symbols a(k) and from the possible states of the symbols ei calculated with reference to FIG. 20.

DETAILED DESCRIPTION OF THE PREFERRED EMBODIMENTS

The appended drawings are, in essence, of definite character. In consequence, they shall not only serve to better elucidate the description, but also contribute to the definition of the invention, as appropriate.

Elaborate mathematical expressions, or ones which are involved repeatedly, are gathered together in an appendix which forms part of the description. They are designated by the letter E, followed by a reference number.

In these expressions, the unit vector of the complex imaginary numbers is conventionally denoted j, with j2=−1. Moreover, the symbol "i", employed as an index or as a summation variable, is used in several guises, with different meanings; specifically, the sizeable number of relations invoked does not allow the systematic use of a different letter each time, and in principle the context removes any ambiguity. Likewise, the sets of values taken by the variables i, k, t, . . . are not generally made explicit, except when this proves to be necessary. These sets are deduced from the context by taking all the possible values over the entire duration of the signal analysed. The expressions for the minimum and maximum values as a function of the unknowns of the models is of no practical interest in the algorithm. Furthermore, the symbol * as an exponent indicates the conjugate of a complex number; where a matrix is concerned, it indicates its conjugate transpose. Finally, two adjacent characters may indicate a product, if the context indicates that they pertain to two different variables: for example, the product of 2 and L1 is denoted 2L1 or 2.L1.

The words "estimate" and "estimation" refer to the evaluation of an unknown quantity, without any a priori assumptions regarding the accuracy of this evaluation.

Finally, to simplify the exposition and the description, the noise is not taken into account in the mathematical expressions given hereinafter.

The invention relates to the analysis of communication signals. Within this domain, one starts from a captured communication signal, whose raw information content (that is to say independently of any ciphering) one endeavours to determine. It is assumed that the captured signal has been recorded and that it is analysed off-line.

According to the work "Digital Communications", John G. PROAKIS (chapter entitled "Representation of digitally modulated signals", p. 163, second edition, McGraw Hill Book Company), a signal corresponding to a linear digital modulation is modelled in the manner indicated in relation E1 (see the appendix where most of the formulae are gathered), in which relation:

the a(k) (k a positive integer) are the information symbols transmitted, which can take only a finite number of possible values, or states, g(t) is the elementary modulation function (or "elementary pulse shape"), applied to each symbol, 1/T is the tempo of transmission of the symbols, and f0 is the carrier frequency used.

Figure 2A:
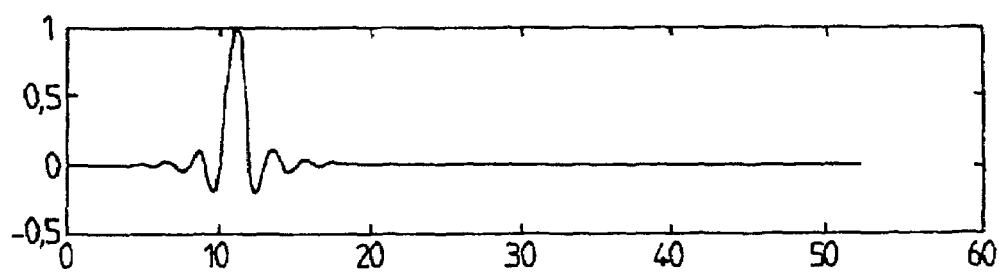
FIG. 2A illustrates an example of an elementary modulation function in the form of a "root of raised cosine" pulse, as a function of time expressed in periods T.
Figure 2B:
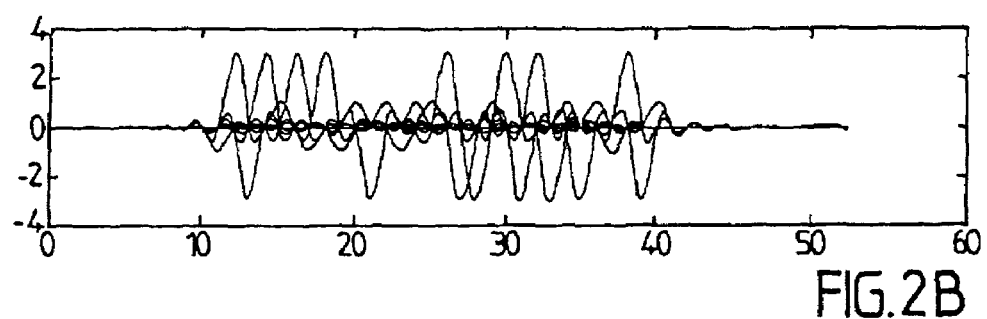
FIG. 2B illustrates a superposition of signals a(k)g(t−kT) (or symbols) transmitted successively, as a function of time expressed in periods T.
Figure 2C:
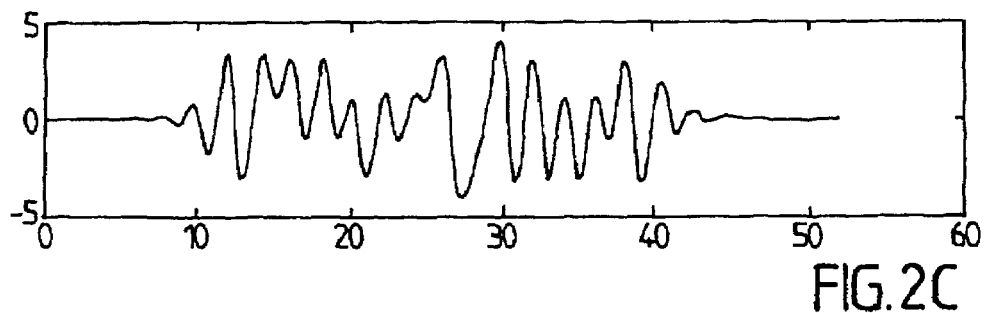
FIG. 2C illustrates the resultant of the signals of FIG. 2B.

The elementary modulation function (that is to say the one applied for each symbol) is for example a "root raised cosine" pulse shape (FIG. 2A). Such a waveform is described for example in the aforementioned work by Proakis, page 536. Usually, the elementary modulation functions encountered in practice have, as in the above example, lengths greater than T. It follows that the various signals a(k)g(t−kT) (or symbols) transmitted successively every T seconds are partially superimposed (FIG. 2B). In accordance with the resultant of this superposition (FIG. 2C), it is clear that this phenomenon greatly contributes to making the analysis of the type of modulation difficult.

Furthermore, the symbols used are chosen from an alphabet or constellation of symbols (example in FIG. 2D), which are themselves expressed in complex notation.

Applicants have set themselves the problem of determining which type of modulation is employed in a captured message, so as subsequently to determine the parameters used for this modulation, up to the state (or value) of the string of symbols actually transmitted.

The present invention aims to propose a solution which is applicable in particular to the linear digital modulation model alluded to hereinabove, which will be used in the examples given hereinafter. It is recalled that the following form part in particular of this linear digital modulation model:

modulation by phase shift keying (PSK),
modulation by amplitude shift keying (ASK), and
quadrature amplitude modulation (QAM).

Before embarking on the detailed description, the processing operations proposed will firstly be stated in a general manner.

At the basic level, the various unknowns of the model are firstly estimated by assuming that the signal intercepted does indeed correspond to a linear digital modulation; subsequently, this assumption will be validated or otherwise from these estimates.

To achieve this, Applicants have concentrated on the one hand on techniques of matrix calculation over complex numbers (linear algebra), and on the other hand on statistical aspects of signal processing.

The symbols contained in the starting signal are derived from an a priori unknown "alphabet" of symbols, with an elementary modulation (the modulation applied to each symbol) which is also unknown.

However, Applicants have firstly observed that, the starting signal being of finite duration, the number of successive symbols which it contains is also finite. Applicants then surmised that after having assumed that this starting signal satisfies the linear digital modulation model, there must exist a means—at least—of retrieving the string of symbols, by concentrating on the number of degrees of freedom (or parameters) which are necessary to obtain a representation of the starting signal (after approximate demodulation in the example described).

Applicants have sought such a means. This being so, they have firstly concentrated on the manner of representing the starting signal (preferably after a first demodulation). As will be seen hereinafter, they have found "function bases" which make it possible, by "projection", to represent most of the signals which may be encountered in practice, and to do so with minimal loss of information, which is in this instance negligible.

From this they have developed a technique, nonlimiting, relying on interesting properties of a particular solution of the linear digital modulation model; for the determination of the symbols, Applicants also exploit the fact that they are decorrelated or weakly intercorrelated.

The said particular solution, to which we shall return hereinafter, is unique, and makes it possible to generate, through linear combinations, all the possible solutions, as will also be seen. It is the solution hm(t) the length of whose support is smallest.

It is known that, mathematically, the "support" of a function f(x) can be defined as the set of values of the variable x for which the function f(x) is different from zero. Here one is dealing with functions of time representing a signal of finite duration. Thus, the signal z(t) has bounded support; likewise, the modulated elementary modulation function gm(t) has bounded support, which may be called the "temporal length" of the elementary modulation. For its part, the support of the function hm(t), that is to say the length of the time interval over which hm(t) is non zero, is at most equal to the temporal length of the elementary modulation. This will be understood owing to the fact that it must be possible to decompose the elementary modulation according to the function hm(t).

It will furthermore be seen that, after application of this solution hm(t) of minimal support, the symbols cm(k) associated with this particular solution are expressed in a relatively simple manner as a function of the true symbols a(k) of the carrier residual Δf0=f0−fa and of a filtering residual αi, and will make it possible to access these unknowns.

It would be conceivable to work on the basis of a solution other than that of "minimal support", but the expression for the residual would then be more complicated.

The various steps of the processing described in detail hereinafter are (FIG. 3):

switch to complex signal z(t) (100),
estimation of the tempo 1/T (200),
"approximate" estimation fa of the carrier frequency f0 (300),
demodulation of the complex signal z(t) via this approximate carrier frequency fa (400),
estimation of the function hpm(t) (500, 501, 510, 520),
estimation of the modulated symbols cm(k) associated with hpm(t) (610),
estimation of the filtering residual αi and of the symbols am(k) from the symbols cm(k) (650),
estimation of the carrier residual Δf0 (700),
demodulation of the symbols am(k) by the carrier residual (800), so that only symbols a(k) remain,
estimation of the possible states or values ei of the symbols a(k) with the aid of the alphabet (900),
estimation of the symbol train actually transmitted e(k) as a function of the possible states (950),
determination of the fit of the model of a linear digital modulation (990), using the parameters previously estimated (validation or otherwise of the assumption).

To facilitate understanding, all the processing operations will be described, from receipt of the electromagnetic signal. However it should be clear, as already indicated, that the invention can be implemented using a recorded signal which has already undergone some of the processing operations, in particular the switch to the complex signal, in which case it is already available in memory 100.

Figure 1:
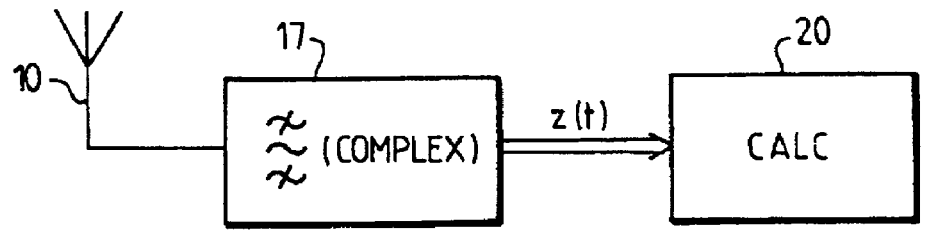

FIG. 1 illustrates the principle of switching to a complex signal (100). The real signal received, such as it arises from an antenna 10, is defined by the expression E1. For the processing, it is made to undergo a complex filtering 17, whose transfer function is matched to the spectrum of the signal as will be seen hereinafter. This filtering provides a calculator 20 with a complex signal z(t) possessing an "in-phase" component I and an "in-quadrature" component Q. The person skilled in the art is aware that this complex signal can be represented like the complex numbers.

A complex filter centred on a frequency fl can be defined by its impulse response, which corresponds to relation E2: one starts from the impulse response p(t) of a conventional real low-pass filter (FIG. 4A), which is multiplied by the expression E3, hence the shifted spectrum of FIG. 4B. The word "real" signifies here, as subsequently, "real-valued", as opposed to complex-valued. Thus, with reference to FIG. 1, if the spectrum of the input signal is that of FIG. 4C, a filter having the transfer function of FIG. 4B yields a complex signal having the spectrum of FIG. 4D.

Figure 1A:
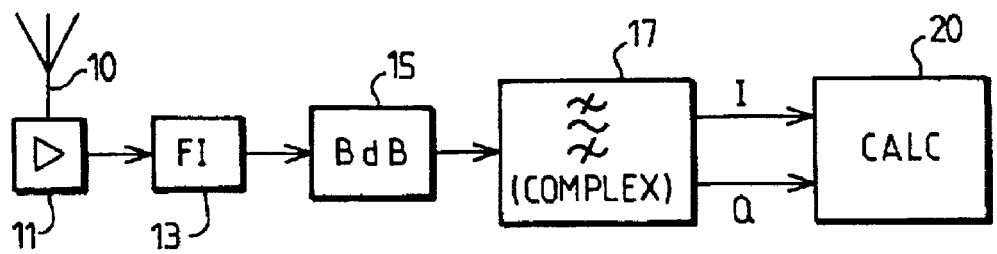

In one embodiment (FIG. 1A) there is provided, after the reception amplifier 11, one or more intermediate frequency (IF) stages 13 followed by a baseband conversion stage 15, then by the complex filtering 17. The analog-digital conversion is generally done either at the input of the stage 15, or inside the stage 15, or at its output (with a lower sampling rate in this last case).

Figure 1B:
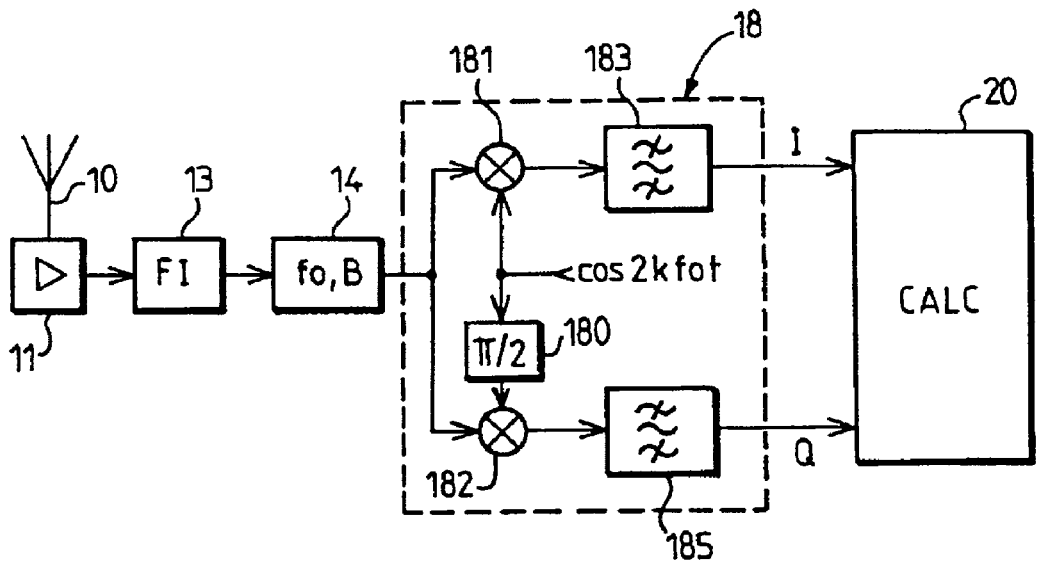

Other techniques can be envisaged for obtaining the complex signal, in particular a Hilbert transform (not represented), or else a complex demodulation IQ into an in-phase component I and an in-quadrature component Q, as illustrated in FIG. 1B: after a stage 14, where the signal lies in a band B around a central frequency f0, there is provided a stage 18, with two mixer pathways 181 and 182, receiving a signal cos $2\pi f0 t$ directly or in quadrature (stage 180); the mixers are followed by filters 183 and 185, which yield the outputs I and Q, respectively. The analog-digital conversion is generally done before or after the stage 18.

Step 200 consists of an estimation of the tempo 1/T of the unknown modulation which is presumed to exist in the signal received. One of the techniques which can be used to this end will now be described.

The signal x(t) with expression E4, where the time shift X is small compared with the value T equal to the inverse of the tempo sought, is formed at 201 (FIG. 6) from the complex signal z(t). It is known that, to conjugate $z(t-\tau)$ in E4, it is sufficient to change the sign of its complex imaginary component. The time shift $\tau$ can be chosen equal to the sampling stepsize.

Applicants have noted that the sought-after tempo corresponds, in the spectrum of this signal x(t), to a spectral line of frequency (1/T). For the subsequent processing operations, it is useful to estimate the position of this line, as accurately as possible.

To do this, the spectrum X(f) of the signal x(t) is calculated at 202. Advantageously, an interlaced (so-called "zero padding" technique, well known to those skilled in the art) Fast Fourier Transform (FFT) is used for this.

An interlacing of at least 8 (eight) is chosen as parameter of the FFT.

The output from this FFT (FIG. 5A) is subsequently processed at 203, for example in accordance with relation E5: each value of X(f) obtained at a frequency f is normed via the mean of the values X(f) obtained for frequencies lying within a window of width 2.Δfi, centred about f. This processing constitutes a kind of nonlinear filtering of the output of the FFT which aims to emphasize the lines contained in this spectrum (FIG. 5B). The width 2Δfi fixes the degree of filtering obtained. Here, it has been fixed by simulation at 20 times the inverse of the total duration of the signal analysed.

Subsequently, at 204, this signal is threshld in such a way as to select the spectral lines which it contains, and, at 205, the lines at the negative frequencies are ignored (FIG. 5C).

Because of the interlacing of the FFT, several sub-lines remain in the vicinity of f=1/T (FIG. 5D). The sought-after value 1/T is then estimated in step 206 via an interpolation which can consist in fitting a curve, of the polynomial type, for example, which passes through the tops of these various sub-lines and by taking the maximum of this curve.

An approximate estimate fa of the carrier frequency f0 (step 300) is determined in parallel with the estimation of the tempo of the modulation. The approximate estimation is useful, in so far as it will serve to perform a first demodulation, which makes it possible subsequently to work at low frequency: the function basis will be defined at low frequency, and the matrix calculations will be performed on samples which are likewise available at low frequency.

The approximate estimate fa can be obtained in various ways. Applicants preferably take fa to be the mean value of the instantaneous frequency of the signal. This mean value fa is for example calculated as follows:

as at 201, the signal x(t) with the expression E4 is firstly taken, then at 311, the mean value of the phase of x(t) is calculated over the entire duration of the signal, and it is divided by $2\pi\tau$.

This technique relies on the fact that, if $\tau$ is small compared with T, the discrepancy between the phase of the signal z(t) at the instant t and the phase at the instant $(t-\tau)$ depends only on $\tau$ and f0. As before, $\tau$ may be chosen equal to the sampling stepsize (case of FIG. 6), or else calculated by taking a small fraction of T.

FIG. 7A shows an example, where x(t) is defined by a scatter of points, corresponding to a mean value fa=1940 Hz.

If fa has been estimated, a demodulation of the complex signal z(t) is carried out (step 400) via this approximate estimate fa of the carrier f0, in a known manner. Numerically, the demodulation consists of a complex multiplication of the signal z(t) by an expression similar to E3, where f1 is replaced with –fa.

After this demodulation, the initial spectrum (FIG. 7B) of the complex signal will centre itself approximately on the zero frequency (FIG. 7C). The residual decentring of the spectrum corresponds to a small carrier residual Δf0 equal to f0–fa. An example is given in FIG. 7D, where the chain-dotted line represents the spectrum of the signal before demodulation, whilst the continuous line represents the spectrum of the signal after demodulation.

The signal obtained after demodulation by fa will again be denoted z(t), in accordance with the linear digital modulation model. This signal z(t) henceforth satisfies formula E10. Applicants have observed that this signal z(t) can also be written according to expression E14, as a sum of products each of which involves:

a modulated elementary modulation function gm(t), defined by relation E12, and a string of modulated symbols am(k), defined by relation E13.

In these expressions and subsequently, the index m signifies "modulated", and k goes from 1 to kx, which is the total number of symbols involved in the signal analysed.

This is proved by rewriting formula E10 in the manner expressed in formula E11.

It will be noted that the expression E14 is "devoid of any apparent carrier", that is to say that the carrier residual Δf0 no longer appears there explicitly. Indeed, it is contained in the "modulated" elementary modulation function gm(t) and in the modulated symbols am(k).

To access the symbols, it will be expedient to estimate this elementary modulation function gm(t). Also unknown are the carrier residual Δf0, the set of symbols used, or "alphabet", and the string or train of symbols specifically contained in the starting signal.

In the embodiment described, step 500 (501–520) consists in estimating the modulated elementary modulation function, that is to say the function gm(t). From this will be deduced the modulated symbols am(k) at step 600 (610–650) (see FIG. 3).

The following difficulty arises first of all: it is a difficult task to work with a signal defined for each value of t, given the potentially very high number of values to be considered.

Applicants propose that an approximation be made by projecting the signal z(t) onto a "basis" of functions, which is chosen in advance. This basis (in the mathematical sense of the word) is in fact a free family, preferably orthonormal, of functions ($\phi1(t)$, $\phi2(t)$, ... $\phi b(t)$).

A function basis ($\phi1$, $\phi2$, ... $\phi b$) matched to the tempo 1/T as estimated earlier is chosen and constructed for example in the manner indicated in expressions E25 and E26. In these expressions, recto denotes the rectangular function over the time interval indicated below. The integer q is such that the product q.T is substantially equal to the length of the signal analysed. b corresponds to the number of bases functions required to cover the entire duration of the signal analysed.

Other conceivable function bases will be indicated later. However, Applicants currently consider that the function basis of expressions E25 and E26 remains the simplest, and yields approximations which are amply sufficient for signals encountered in practice.

Whatever embodiment is chosen, a "representation" of the function basis exists in the device. It is this that is recalled by the block 501 of FIG. 3. In this instance, this representation can be parametrized by T.

In the embodiment described in detail hereinafter, the basis defined by E25 and E26 is used. There are thus two basis functions per interval of T seconds: thus two projection coefficients will be obtained every T seconds (one also talks about "two points per symbol", given that a symbol is received every T seconds). The way in which the invention can be extended to integer values greater than 2 ($q \geq 2$) will be seen later.

The approximation then begins with the calculation of the projection of the signal z(t) in the space (likewise in the mathematical sense of the word) generated by the functions $\phi i(t)$. This projected signal will thereafter be defined only by projection coefficients which, themselves, will be finite in number, less than the number of time samples of the signal z(t).

The signal z(t) is therefore firstly projected (510, FIG. 3) onto the function basis defined by relations E25 and E26. This projection is denoted zp(t) where the index p signifies "projected".

Applicants have observed that approximating the signal z(t) by its projection in the basis consisting of the $\phi i(t)$ amounts to approximating the functions gm(t–kT) (k varying) involved in the model of the signal by their projections in this same "basis". The basis is chosen so that all the basis functions are deduced by translation by an integer number of T of a small number of functions $\phi1(t)$, $\phi2(t)$, ... (two functions for a basis having two points per symbol, q functions in the general case). Applicants have then observed that the projections of the functions gm(t–kT) are deduced from one another by translation by T: they are therefore defined by the same projection coefficients to within a time shift. Everything takes place as if the unknown function gm(t) had been approximated by its projection in the basis $\phi i(t)$, which is written with a small number of unknown coefficients, which will need to be found.

For greater simplicity, the functions $\phi1(t)$, $\phi2(t)$, ... generating the basis by translation by kT ($k \in N$) are chosen in such a way that they are also deduced by translation by T/2 (more generally by T/q, $q \in N$) of one and the same function $\phi i(t)$. We thus obtain the bases E25 and E26 (two points per symbol) and E34 and E35 (q points per symbol), where the functions $\phi i(t)$ are ultimately deduced from one another by translation by kT/2 and kT/4 respectively ($k \in Z$).

Applicants have moreover observed that the functions gm(t) encountered in practice are sufficiently smooth as to be approximated with few errors in these function bases. A schematic example of such an approximation is illustrated in FIG. 8C.

Applicants have also observed that, in order to project the signal z(t) into the function basis defined by relations E25 and E26, it is possible to filter the signal via the filter of impulse response $\phi1(-t)$ (expression E25), then to sample the output of this filter every T/2 seconds. It is therefore apparent that this projection is particularly simple to undertake.

As shown in FIG. 10A, the signal is centred on the zero frequency and possesses, in practical cases, a spectral band of width 1/T. The projection filter is also centred on the zero frequency; by contrast, it possesses a band of 2/T (at 4 dB). The person skilled in the art will deduce therefrom, as has already been stated in respect of the function gm(t), that, as a result of the approximation made by this projection, that part of the signal which is lost by projection is negligible.

Incidentally, interesting synergies of this embodiment will be noted: the prior estimation of the tempo enables the projection of the signal onto the function basis to be well synchronized with the modulation tempo; estimation of the mean of the instantaneous frequency enables this projection to be done on a function basis of low frequency.

Figure 3:
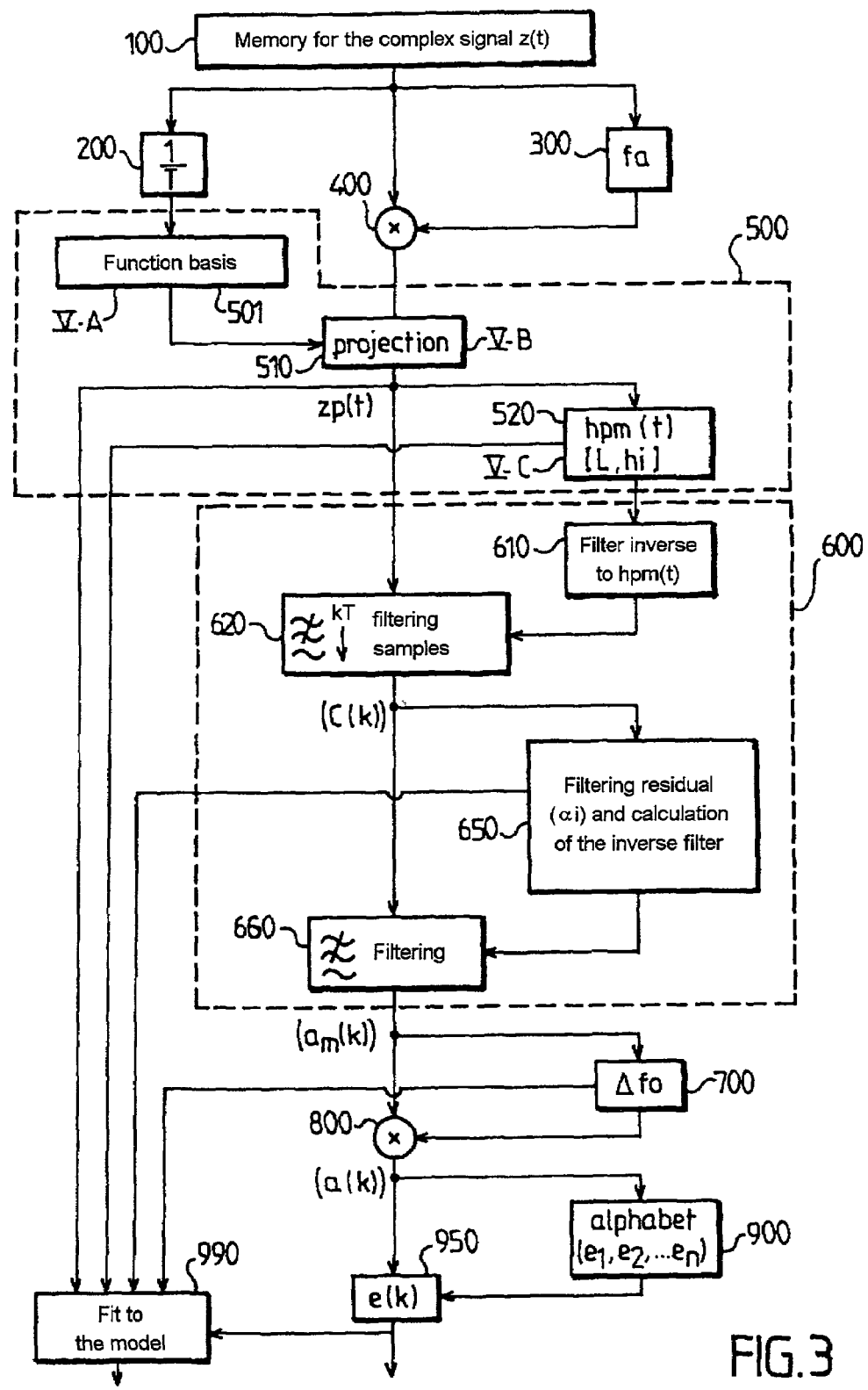
FIG. 3 illustrates the main processing steps of the process according to the invention.

Work by Applicants has shown that with two samples per symbol (at least), that is to say with at least two projection functions every T seconds, it becomes possible to find solutions of the model (linear digital modulation model) which correspond to the starting signal, with the aid of matrix calculation techniques (block 520, FIG. 3).

However, the said work has also shown that, for a given starting signal, relation E14 admits a multiplicity of pairs of possible solutions.

Among all these possible solutions, Applicants have focused on searching for that which satisfies the following property: we require the solution yielding modulated symbols am(k) which, after demodulation, will take the smallest possible finite number of values.

After having envisaged imposing this constraint directly, Applicants currently prefer to proceed in two stages, as will be seen.

At least when z(t) is a signal arising from a linear digital modulation, Applicants have shown the following:

among the many possible solutions of the modelling, there exists only one (cm(k), hm(t)) satisfying relation E20, where hm is, among the solution modulation functions, the one whose support is of shortest length;

furthermore, this particular solution (cm(k), hm(t)) generates all the possible solutions as follows: if (am(k), gm(t)) is another solution, then there exist n coefficients ($\alpha1$, ... $\alpha n$) making it possible to satisfy expression E21 yielding gm(t), whilst the symbols am(k) are defined recursively, for all the values of k, by expression E23.

Applicants have derived therefrom that the modulated elementary modulation function gm(t) can be written according to expression E21, where hm(t) is the unique solution function of smallest support.

Basing themselves on the foregoing remarks, Applicants advocate that the search for the function gm be split into two parts:
  initially, one searches for the solution (cm(k), hm(t)) with the constraint that hm(t) has the smallest possible support,
  subsequently, utilizing the symbols cm(k) corresponding to this solution hm, and modelling according to expression E23, one estimates the second part of the function gm, namely the coefficients ($\alpha i$), which is globally dubbed the "filtering residual".

Subsequently the signal will be modelled by the pair of relations E22 and E23, where hm(t) is the solution function of smallest support, and the ($\alpha i$) are the filtering residual.

As was stated previously, approximating the signal z(t) by its projection in the space of functions $\phi i(t)$ amounts to approximating the function gm(t) by its projection in this same space. The same holds for the particular solution hm(t), which will be replaced with its projection in the basis of functions ($\phi 1(t), \phi 2(t), \ldots, \phi b(t)$). This projection hpm(t) will thereafter be defined only by a small number of projection coefficients.

Now, the projection zp(t) of z(t) is hereafter modelled only using the projection hpm(t) of hm(t). The (small) part of the signal which is orthogonal to the projection "basis" is lost. The function basis E25, E26 has been chosen in such a way that the lost part of the signal is sufficiently weak for the signals encountered in practice.

An example of the carrying out of the processing operations aimed at estimating hm(t) will now be given, with reference to FIG. 9.

Firstly, as already indicated, the signal z(t) is projected onto the function basis $\phi i(t)$. In this instance, this consists, at 510, in filtering the signal z(t) through the filter of impulse response $\phi 1(-t)$ (expression E25), then, at 523, in sampling the output from this filter every T/2 seconds, up to the end of the signal z(t).

The function hpm(t) of smallest support, which is the solution of equation E30, is then estimated.

The projection zp(t) of the signal z(t) can be written using its projection coefficients z(k) according to relation E36 (with p standing for projected).

For its part, the projection hpm(t) of the function of smallest support hm(t) is written according to relation E37, where L is the length of hpm(t), reckoned in terms of number of periods T. Stated otherwise, the length of hpm(t) is greater than (L−1).T and less than or equal to L.T.

Given the rate of two samples (two projection coefficients) per symbol every T seconds, two successive samples of rank 2k+1 and 2k+2 of the projection zp(t) correspond to the pair of values z(2k+1) and z(2k+2), which pair is modelled according to relations E38.

The first step of the processing consists in estimating the length L of hpm(t).

In this regard, Applicants have noted that the lengths of the elementary modulation functions gm(t) encountered in practice are generally less than 10 times T.

A parametrizable upper bound L1, such that L1=10.T, is then chosen. With each rank k, step 525 matches up a vector or unicolumn matrix ZL1(k) in accordance with expression E41. The vectors ZL1(k) correspond to signal slices z(t) taken between instants kT and (k+L1)T. This vector ZL1(k) contains 2.L1 successive components in r(k), going from (2.k+1) to (2.k+2.L1). The vectors ZL1(k) overlap one another in large part: ZL1(k+1) is deduced from ZL1(k) by eliminating z(2k+1) and z(2k+2) from the top, by raising the other elements by two slots, and by adding z(2k+2L1+1) and z(2k+2L1+2) at the bottom. The construction of these vectors ZL1(k) from the basic data is therefore done with an interlacing.

The square matrix ML1, of dimension 2.L1, defined by relation E42, is formed at 527. This is a kind of covariance matrix of the quantities z(k); however, in contradistinction to the customary covariance, the constituent vectors are interlaced; this is why Applicants propose to dub ML1 the "interlaced covariance matrix".

The eigenvalues ML1 are calculated at 529 in a known manner. Their analysis makes it possible to access the length L of the function hpm(t), since Applicants have established that the matrix ML1 possesses L1+L−1 non-zero positive eigenvalues, and L1−L+1 (less than L1+L−1) zero (in fact almost-zero on account of noise) eigenvalues.

For example, these eigenvalues can be arranged in descending order of magnitude. The distribution of the eigenvalues is given approximately by FIG. 12, where the ordinate is the magnitude of the eigenvalues, which are arranged in descending order of magnitude along the abscissa. The index or rank of the eigenvalue (after sorting) is estimated, this corresponding to the break point of the line of FIG. 12, that is to say to the point where one drops abruptly to almost-zero eigenvalues, corresponding to noise. This break point is conventionally estimated by using the so-called "MDL" (standing for Minimum Description Length) criterion. Refer to the article "Detection of Signals by Information Theoretic Criteria", IEEE Transactions on Acoustics, Speech and Signal Processing, April 1985, p. 387. The estimation of this break point can be interpreted as the estimation of the rank of the matrix ML1.

The length L of the function hpm(t) is given by the post-sorting rank of the first zero eigenvalue.

Vectors ZL(k) defined by the 2.L consecutive components in z(k) of expression E44 are now formed at 535. The matrix ML (dimension 2L×2L) with expression E43 (similar to the expression E42, but with L instead of L1) is formed, at 537, from these vectors ZL(k).

This matrix ML is another "interlaced covariance matrix", but with an interlacing restricted to L instead of L1. The vectors ZL(k) correspond to slices of the signal zp(t) which are taken between the instants kT and (k+L)T.

The processing is then as follows. The smallest eigenvalue of ML is determined at 539 by calculating, for example, as before, all the eigenvalues (which are positive on account of the hermitian symmetry of ML) and by arranging them in descending order.

The eigenvector associated with this smallest eigenvalue is calculated at 541. Applicants have in fact established:
  that in this case the matrix ML has a single almost zero eigenvalue $\lambda$,
  that the magnitude of this eigenvalue makes it possible to estimate the power of the noise $\sigma 2 = \lambda/L$, and
  that the eigenvector associated with this eigenvalue (expression E45) depends only on the function hpm(t), the solution having the smallest support.

The projection coefficients of hpm(t) are therefore obtained (apart from the sign) at 543 by taking the complex conjugates of the components of this eigenvector in order, and by changing the sign of one out of every two of these components (one can work to within the sign).

It will be noted in passing that steps 535 to 539 are the same as 525 to 529, on replacing L1 with L. They can therefore be implemented by the same calculation means.

This processing can be interpreted as follows:

the vectors ZL1(k) correspond to a chopping of the signal zp(t) into slices of length L1.T, which overlap;

these vectors are defined by the 2.L1 projection coefficients (z(2k+1), . . . ,z(2k+2L1)), which are a priori capable of taking any value in the corresponding vector space of dimension 2.L1;

however, on each slice this signal zp(t) becomes the signal u(t) according to relation E47, whose elements z1(t), . . . , zL+L1−1(t) are defined by relations E48;

consequently, on each of these slices, the signal zp(t) is always a linear combination of the same (L1+L−1) signals z1(t), . . . ,zL+L1−1(t), a linear combination whose coefficients are the symbols cm(k) involved in the relevant slice and therefore varying from one slice to another;

although defined at the start using its 2.L1 projection coefficients (z(2k+1), . . . ,z(2k+2L1)), each slice of the signal zp(t) therefore in fact takes its values only in the same function subspace generated by the L1+L−1 signals defined hereinabove.

Applicants have also shown that the condition "hpm is the solution having the smallest support" is equivalent to the condition "the previous L1+L−1 signals are linearly independent".

On each slice of length L1T, the signal zp(t) therefore takes its values in a space of dimension L1+L−1.

The matrix ML1 defined previously makes it possible, by diagonalization, to estimate the subspace containing these signal slices, from the eigenvectors associated with the non-zero eigenvalues. To simplify the processing, it is possible, as described, to estimate only the rank L1+L−1 of this matrix ML1 (number of eigenvalues which are not very small or zero). After having deduced L therefrom, it is then possible to rechop the signal into slices of length L.T.

The same reasoning as before then demonstrates that these signal slices generate, in the function space of dimension 2.L, a subspace of dimension 2.L−1, since:

it is now known that each of the slices of length L.T of the signal zp(t) is capable a priori of taking its values in a space of dimension 2.L; but that in fact on each of these slices, the signal zp(t) is always a linear combination of the same (2.L−1) signals s1(t) . . . sL+L−1(t) of equation E48 where L1 is replaced with L.

In short, there exists, in the function space, a direction which is orthogonal to each of the signal slices: this is the one generated by the eigenvector V of expression E45, associated with the zero eigenvalue of the matrix ML.

hpm(t) has now been estimated. It is then possible to go to step 600, which is the estimation of the train of modulated symbols cm(k) associated with this estimated function hpm(t).

This is done by filtering the signal zp(t) through the inverse filter 610 of hpm(t). A nonlimiting way of calculating the inverse filter will now be indicated, utilizing the pseudo-inverse matrix of the filtering matrix associated with hpm(t).

One starts from the expression for hpm(t) given in E58 which is the result of the previous processing, obtained via its extension for a projection having more than two points every T seconds. For the particular case of two points per symbol, dealt with hitherto, it suffices to put q=2.

The matrix H given by expression E63 is then formed. This is a rectangular matrix of dimension qL.(L1+L−1) which may be called the "filtering matrix". It is formed as follows. Each column possesses q.L components. The first column is obtained by taking the last q components of hpm(t), and by supplementing with zeros. For the remainder, each column is deduced from the previous one by a downward shift of q slots, whilst supplementing on top with the components of hpm(t) in order, then with zeros, when these components have run out. One continues in this way until the last column containing only zeros at the top and then the first q components of hpm(t) at the bottom. A matrix with L1+L−1 columns is thus obtained.

One then forms the matrix product of expression E64, where the person skilled in the art will recognize the pseudo-inverse matrix of H, of dimension (2.L−1).qL. The coefficients of the inverse filter are estimated via row number L of the matrix given in E64.

The signal zp(t) is then applied at 610 to the inverse filter thus obtained. The output corresponds to the symbols cm(k) of expression E43, in which αi is the filtering residual and the am(k) correspond to the sought-after symbols modulated by the carrier residual Δf0, all these quantities being still unknown at this stage of the algorithm.

To estimate these unknowns, as has been seen, Applicants have envisaged imposing the following condition: the symbols am(k), associated with the filtering residual (αi), must correspond to modulated symbols which, after demodulation, will take the smallest possible finite number of values. The condition which Applicants prefer to impose today is: "the symbol train (am(k)) is, from among the possible solutions yielding decorrelated symbols, that for which the alphabet (set of all possible values) is of smallest size". The condition that the symbols are decorrelated is given by relation E70 and pertains to the covariance of the symbols. The second condition consists in fact in choosing from among the solutions making it possible to overcome the first constraint, the symbol train for which the variance of the modulus of the symbols is smallest (equation E80).

These two constraints, which are simpler to implement, lead substantially to the same result for the signals encountered in practice. (The true symbols transmitted are generally decorrelated).

The individual elements (αi) of the filtering residual are obtained at 650.

In step 651 (FIG. 15), Applicants start from a polynomial Q(Z) constructed from measures in accordance with expression E73, where Z is the variable. Next:

at 653, there are calculated the N complex roots βi of this polynomial Q(Z) with modulus less than 1, at 655, there are constructed the $2^N$ different possibilities of N-tuples constructed from the N roots βi, by replacing, or otherwise, each root βi by its conjugate inverse 1/βi*. Each of the N-tuples is then interpreted as the roots of a filter, at 657, there are thus obtained $2^N$ possible filters one of which corresponds to the filtering residual αi which we seek to calculate, then, at 658, for each filter possibility thus obtained, there is estimated from the symbols cm(k) the train of symbols am(k) corresponding thereto (by inverse filtering) in accordance with relation E23.

It then remains at 659 to choose, from among these $2^N$ possible symbol trains, the one which corresponds to symbols am(k), which, after demodulation by the carrier residual Δf0 which is still unknown at this stage, will take the smallest possible number of different values. One way of proceeding then consists in determining, from among all the possible symbol trains thus identified, the one for which the mean variance of the modulus of the symbols (still modulated) is smallest. This variance is defined by relation E80, in which nb denotes the number of symbols.

The basis of this processing will now be explained.

With the filtering residual ($\alpha i$) there can be associated a polynomial P corresponding to its Z transform the form of which is described by expression E71, where N is an upper bound of the number n of coefficients $\alpha i$. Specifically, this number n is not known in advance but, for the signals encountered in practice, an upper bound N for it can be found. It has already been seen, in fact, that the elementary pulse shapes g(t) encountered in practice have a length of less than 10.T. According to expression E12, the same therefore holds for gm(t). By using expression E21, it is therefore possible to deduce from it that m is less than 10 (the length of hm(t) is in terms of number of T at least equal to 1). In practice N=10 is taken as upper bound, but this value can be parametrized in the algorithm. The only effect of taking an upper bound is that the last few coefficients $\alpha i$ with $i \in \{n+1, \ldots, N\}$ are zero, if this upper bound N turns out to be greater than n.

Moreover there is defined the polynomial P2(Z) with the expression E72, corresponding to the modulus squared of the polynomial P(Z), and which can be interpreted as the Z transform of the modulus squared of the transfer function of the filtering residual $\alpha i$. It is also possible to write the polynomials P(Z) and P2(Z) in factorized form, according to expressions E75 and E76, where the $\beta i$ are the roots of the polynomial P.

Applicants have shown, by using the assumption that the symbols are decorrelated, that the polynomial P2(Z) can be estimated by the aforesaid polynomial Q(Z), to within a multiplicative constant. This polynomial Q(Z) can itself be interpreted as an approximation of the Z transform of the autocorrelation function of the symbols. They have also observed that:

if $\beta i$ is a root of P2 than $1/\beta i^*$ is also a root of P2,
if $\beta i$ is a root of P2 then $\beta i$ or $1/\beta i^*$ is a root of the polynomial P which one is seeking to estimate.

In a variant, it is possible to extend this processing to the case of symbols which might be slightly correlated, that is to say which may be correlated but only with their close neighbours, in accordance with relation E81. In this case, Applicants have observed that a root $\beta i$ of Q(Z) will not always be a root of P2(Z), which serves to define the roots of P(Z).

To form the various possibilities for P, for each root $\beta i$ of Q with modulus less than 1, there will now be a choice between taking $\beta i$ or taking $1/\beta i^*$, or taking neither $\beta i$ nor $1/\beta i^*$. If N is the degree of the polynomial Q, there will therefore be 3N possible filters for choosing the filtering residual. The choice of the correct solution is then made as earlier, by minimizing the variance of the modulus of the symbols.

Exemplary results from all the processing operations for estimating gpm(t) will now be examined:

FIG. 14A illustrates the function hpm(t);
FIG. 14B illustrates the filtering residual, where spikes corresponding to the coefficients $\alpha i$ stand out;
FIG. 14C illustrates the modulated elementary modulation function gpm(t); and
FIG. 17 illustrates the symbols am(k) output by the processing, which correspond to the sought-after symbols, but remain modulated by the carrier residual $\Delta f0$.

These symbols are modelled by the expression E13. The carrier residual $\Delta f0$ now needs to be found so as to deduce therefrom the true symbols a(k), fully demodulated. The processing 700 consists in testing all or part of a span of frequencies [–f1, f1], discretized with a sufficiently fine stepsize. For each tested value of the carrier residual, we calculate the probability density d(x,y) of the corresponding symbols according to formula E82, or else some other quantity of like properties. Refer to the article "an estimation of a probability density function and mode", E. Parzen, Annals of Mathematical Statistics, 1962. The criterion used to select the correct value consists in choosing the frequency $\Delta f0$ such that expression E85 is a maximum. The maximization of this criterion may be likened to minimization of the entropy (measure of disorder) of the symbols obtained after demodulation. It would however be possible to replace this criterion with other functions of the entropy.

When the frequency tested is close to the correct value (FIG. 16), the distribution in the complex plane of the symbols a(k), which is deduced therefrom by demodulation by the frequency tested, corresponds to a constellation with a small number of states, hence a "concentrated" probability density, which is better perceived in the three-dimensional representation of FIG. 18.

When the frequency tested is far from the correct value, the corresponding distribution of the symbols a(k) is more spread out according to circles centred on the origin (FIG. 17, where the scale deforms the circles into ellipses). FIG. 19 shows this in a three-dimensional view.

Once the value of $\Delta f0$ has been estimated in this way, a demodulation 800 makes it possible to obtain the symbol train a(k) corresponding thereto. This demodulation consists of a complex multiplication of the signal by an expression similar to E3, where f1 is replaced with $-\Delta f0$.

The possible states of the symbols must still be estimated (step 900).

Figure 2D:
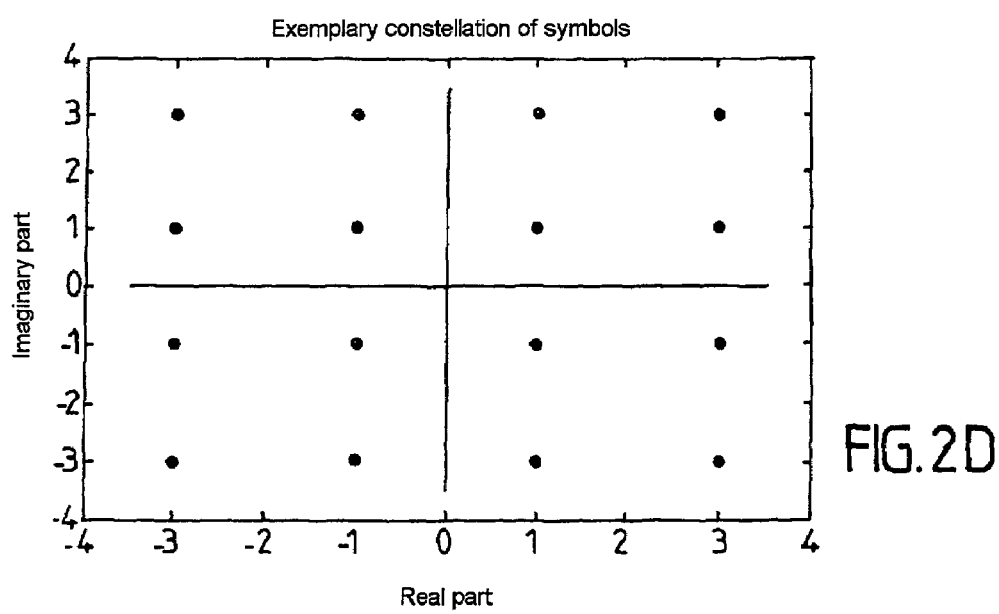
FIG. 2D illustrates a distribution of symbols (or constellation) in the complex plane, the so-called "alphabet"

This step takes account of the fact that the symbols obtained after demodulation correspond to the true symbols, with a number of finite states, but corrupted by the noise of power $\sigma 2$, calculated previously, as shown in FIG. 16 which corresponds to an exemplary result obtained. The various values of the symbols a(k) found are plotted in the complex plane. FIG. 2D corresponds to the alphabet of the symbols a(k) actually transmitted for this example. The phase rotation between the two Figures as well as the different scales stem from the fact that, everything being unknown at the start, the symbol train can only be retrieved to within a multiplicative complex constant.

The objective of this part of the processing is to estimate the position of the possible states. The processing is carried out as follows (FIG. 20):

the first possible state e1 is estimated as the (x,y) position of the maximum of the probability density d(x,y) of the noisy symbols, from this density, the function d2(x,y) corresponding to d(x,y) is constructed but the value is set to zero for all the points lying within a radius of $3\sigma$ (for example) around e1, the second possible state e2 is then estimated by taking the (x,y) position where the function d2 is a maximum, the processing is continued in this way until all the possible states have been processed.

This can be achieved according to steps 901 to 909 of FIG. 20. Among various possibilities, the stoppage criterion for this processing ("COND" condition at 907), making it possible to ascertain whether all the possible states have been estimated, may be that of expression E86, where λ is a threshold which is fixed in advance (0<λ<1).

The principle used is as follows. It is assumed that the values of the symbols transmitted are equiprobably distributed between the various possible values of the alphabet (there is almost the same number of symbols in each of the modes of FIG. 18, for example). The density integrals of expression E86 are proportional to the numbers of symbols forming these densities. Assume that one has estimated n−1 states e1, . . . ,en−1. The stoppage criterion consists in calculating a measure of the mean number per state of symbols corresponding to the states e1, . . . en−1 (right-hand side of E86) and in comparing this quantity with the measure of the number of remaining symbols. If the latter quantity is too small, then not enough symbols remain to form an additional state. These symbols are assumed to be far from the estimated states e1, . . . ,en on account of the noise spikes.

It is now possible to proceed with the estimation of the symbol string such as it was actually transmitted (step 950).

This part of the processing consists, using the train of noisy symbols a(k) and the possible states of the symbols e1, e2, . . . calculated previously, in estimating, for each noisy symbol a(k), the state e(k) intentionally transmitted.

For this purpose, for each symbol a(k), starting from k=1 (step 951, FIG. 21), one searches for the possible state ek which is closest, for example (953) on the basis of the euclidian distance (DIST[ ] function). There will thus be obtained, for rank k, a symbol denoted e(k) taking one of the values ei of the previously estimated alphabet. The minimum distance is determined at 955 in accordance with relation E87, and one can continue by incrementing k (959) up to the maximum value kx (957), in fact until all the noisy symbols a(k) obtained at 800 have run out.

The processing operations for estimating the unknown parameters of the model E1 of the signal, under the "linear digital modulation" assumption, have finished. It now remains to verify that the basic assumption is correct, stated otherwise to validate—or otherwise—the assumption that a linear digital modulation is present (step 990).

The previous processing operations made it possible to estimate the elements recalled at E91. The quantity defined by expression E92 is now calculated and this quantity is compared with a threshold corresponding to the allowable power of the noise. This allowable power corresponds to the noise power σ2 calculated in the "calculation of hpm" part (520), multiplied by the ratio of the starting signal sampling frequency to the tempo of the projection (q/T), and weighted by a coefficient β (0<β<1) so as to take account of the imperfections in the previous estimates of the parameters. The value of β is fixed by simulation.

In short, when the signal received actually corresponds to a linear digital modulation, the difference between the signal received and the estimated linear digital modulation must be a signal corresponding to noise, of low power; conversely, when the signal received is not a linear digital modulation, the said difference is then no longer a signal of low power which may be viewed as noise.

The processing operations described may be implemented on a workstation of the Pentium PC type, with software tools suitable for calculational processing operations, such as MATLAB software. The programs prepared under MATLAB can be used as is, or better transformed into a programing language which executes faster, such as the C language. Utilities for converting MATLAB into the C language are available for example from the distributors of the MATLAB software.

In certain cases where several signals, determinable by a priori spectral analysis, exist in the frequency band analysed, it may be necessary to process the signal received by parts, to each of which will be assigned its own estimate of the carrier frequency.

The basis of "rectangular" functions which was described above is not limiting. Recourse may be had to other sets of functions which satisfy the condition for defining a basis, not necessarily orthonormal, provided that the correlation induced with regard to the projection coefficients is taken into account.

It remains especially beneficial to use a basis whose functions are deduced from one another by time shifting. This in fact permits an advantageous realization of the projection in the form of filtering, followed by a sampling. This possibility is worthwhile for other types of function basis:

if for example ϕ1 is taken to be a raised cosine function of spectral width 2/T (the other functions ϕi being deduced therefrom as before), the spectra are then those of FIG. 10B. The person skilled in the art will understand that, owing to the rectangular shape of the spectrum of ϕ1, still less signal is lost by the projection;

the function basis of relations E34 and E35 can also be taken. This amounts (FIG. 10C) to filtering the signal through the new function ϕ1(t) and to sampling every T/q (sampling with q points per symbol, with q>2). As shown by FIG. 11, in comparison to FIG. 8C, the approximation of hm(t) by its projection hpm(t) in this "basis" is better.

Processing by interlaced covariance matrices was proposed above, applied to the function basis of relations E25 and E26. This processing remains applicable with any function basis for which the projection can be interpreted as a filtering followed by a sampling every T/2 (that is to say with 2 points per symbol).

On the other hand, when the projection corresponds to a filtering followed by a sampling with more than 2 points per symbol, Applicants provide for another version of the said processing, which will now be described, denoting by q the number of points per symbol, with q>2 (or q=2).

After projection, the new measures z(k) (signal projection coefficients) are modelled in the form of relations E50. The vectors ZL1(k) are defined according to relation E51 (like E41, but with q in place of 2).

The matrix ML1 can be formed and processed as before. It is given by expression E52. For the same reasons as before, this matrix ML1 possesses p.L1 eigenvalues of which L+L1−1 are non-zero. The distribution of the eigenvalues is that of FIG. 13. The break in the chart makes it possible here also to estimate the length L (in terms of number of T) of the function hpm(t).

The difference comes in subsequently: if, as before, knowing L, we were to calculate the matrix ML, it would turn out that this matrix, instead of a single zero eigenvalue, would have q.L−(2.L−1) zero eigenvalues (p.L eigenvalues in all, of which 2L−1 are non-zero, following the reasoning given above). When q=2, we have 2L−(2L−1)=1 zero eigenvalue. hpm(t) is deduced from the unique eigenvector associated with this eigenvalue. When q>2, there exists several eigenvectors associated with the zero eigenvalues. It is then no longer possible to deduce hpm(t) therefrom in a simple manner.

To estimate the coefficients of hpm(t), Applicants then make provision to calculate and to use the eigenvectors Vi, from VL1+L to Vq.L1, associated with the zero eigenvalues of the matrix ML1. The q.L1 components of such a vector (with index i) are denoted in the manner indicated in E55, with I ∈ {L1+L, ... , p.L1}.

One then forms the matrices Pi defined in E56. These are rectangular matrices of dimension q.L * q(L1+L)−1 formed in the same way as the matrix H making it possible to generate the filter inverse to hpm(t). Each column of such a matrix possesses q.L components. The first column is obtained by taking the last q components of the relevant vector Vi, and by supplementing it with zeros. For the remainder, each column is deduced from the previous one by a downward shift of q slots, supplementing the top with the components of Vi in order, then with zeros when these components have run out. Thus, in the second column, we take q extra components at the top, and so on until the column is completely filled with zeros and the first q components of Vi. The number of rows of the matrices Pi being fixed at q.L, we obtain L1+L−1 columns.

One next forms the matrix G defined by expression E57. It can be regarded as an approximate form of a so-called "projection into the noise space" matrix.

One searches for the eigenvalues of the matrix G, then for the eigenvector associated with the smallest eigenvalue. The components of this eigenvector are, in order, the sought-after components of hpm(t) in the relevant function basis.

Indeed, Applicants have shown that this matrix has a single zero eigenvalue (no noise), and that the eigenvector associated with this eigenvalue obeys relation E58.

The power σ2 of the noise is in this case estimated by taking the mean of the almost-zero eigenvalues, divided by L1. The symbol train cm(k) is itself estimated from zp(t) and hpm(t) in the same way with q>2, as with q=2, by constructing the matrix H in accordance with expression E63, taking the value q used.

This process is preferential in the case where there are more than 2 points per symbol (q>2). It can also be applied in the case where q=2. In this case hpm(t) is estimated directly from ML1 without involving ML.

The invention is not limited to the embodiments described.

For certain applications, it may be advantageous to refine the approximate estimation fa of the carrier frequency f0. Various techniques are available for this purpose. It is for example possible to estimate fa by searching for the frequency, which, after demodulation of the signal thereby, minimizes the quadratic band of the signal. If one succeeds in rendering the residual discrepancy negligible, then the step for estimating Δf0 and the demodulation which follows it become irrelevant.

It will be noted that the starting signal captured and recorded cannot always be likened to the signal actually transmitted, from which it may differ for various reasons, for example multiple propagation paths. This may result in alterations to certain steps of the processing. Multiple paths, which may be pictured as echoes, modify the shape of the function g(t) and more especially increase its length. The modification of the shape does not change the algorithm since the latter estimates this shape without any a priori assumptions. On the other hand, the upper bounds L1 and N of the lengths of hpm and αi must be increased. These quantities which can be parametrized within the algorithm have to be fixed according to the maximum length of the assumed echoes.

The invention has been defined essentially with reference to linear digital modulation. It can be extended to other types of modulation for which the processing steps proposed would be appropriate, at least in part. Such is the case in particular for allied types of modulation, such as continuous-phase digital frequency modulation, among other frequency shift keyings (or FSKs). The person skilled in the art will understand that, in this case, the modelling of the instantaneous frequency conforms to an expression much like formula E10 on replacing Δf0 by zero. All the parameters in E10 are in this case real numbers.

$$r(t) = \text{Re}\left[\sum_k a(k)g(t-kT)e^{j2\pi f_0 t}\right] = \text{Re}[z(t)] \tag{E1}$$

$$p(t) \to p(t)e^{j2\pi f_i t} \tag{E2}$$

$$e^{j2\pi f_i t} \tag{E3}$$

$$x(t) = z(t)z*(t-\tau) \quad (\tau\text{small}) \tag{E4}$$

$$X(f) \to X_1(f) = -\frac{X(f)}{\text{mean}\,(|X(f_i)|)} \tag{E5}$$
$$f_i \in [f - \Delta f_i,\ f + \Delta f_i]$$

$$z(t) = \sum_k a(k)g(t-kT)e^{j2\pi\Delta f_0 t} \tag{E10}$$

$$z(t) = \sum_k (a(k)e^{j2\pi\Delta f_0 kT})(g(t-kT)e^{j2\pi\Delta f_0(t-kT)}) \tag{E11}$$

$$g_m(t) = g(t)e^{j2\pi\Delta f_0 t} \tag{E12}$$

$$a_m(k) = a(k)e^{j2\pi\Delta f_0 kT} \tag{E13}$$

$$z(t) = \sum_k a_m(k)g_m(t-kT) \tag{E14}$$

$$(a_m(k),\ g_m(t)) \tag{E15}$$

-continued $$\sum_k c_m(k)h_m(t-kT) = \sum_k a_m(k)g_m(t-kT) \qquad (E18)$$

$$z(t) = \sum_k c_m(k)h_m(t-kT) \qquad (E20)$$

$$g_m(t) = \sum_{i=0}^{n} \alpha_i h_m(t-iT) \qquad (E21)$$

$$\begin{cases} z(t) = \sum_k c_m(k)h_m(t-kT) \\ c_m(k) = \sum_{i=1}^{n} \alpha_i a_m(k-i) \end{cases} \qquad (E22)(E23)$$

$$\begin{cases} \varphi_1(t) = \underset{\left[0, \frac{T}{2}\right[}{rect(t)} \\ \forall i \in \{1, \ldots b\} \; \varphi_i(t) = \underset{\left[(i-1)\frac{T}{2}, i\frac{T}{2}\right[}{rect(t)} = \varphi_1\left(t - (i-1)\frac{T}{2}\right) \end{cases} \qquad (E25)(E26)$$

$$\begin{cases} z_p(t) = \sum_k c_m(k)h_{pm}(t-kT) \\ c_m(k) = \sum_{i=1}^{n} \alpha_i a_m(k-i) \end{cases} \qquad (E30)$$

$$\begin{cases} \varphi_1(t) = \underset{\left[0, \frac{T}{q}\right[}{rect(t)} \quad q \in IN \setminus \{0, 1\} \\ \forall_i \in \{1, \ldots b\} \; \varphi_i(t) = \underset{\left[(i-1)\frac{T}{q}, i\frac{T}{q}\right[}{rect(t)} \end{cases} \qquad (E34)(E35)$$

$$z_p(t) = \sum_k z(k) \cdot \varphi_1\left(t - (k-1)\frac{T}{2}\right) \qquad (E36)$$

$$h_{pm}(t) = h_1 \cdot \varphi_1(t) + h_2 \cdot \varphi_1\left(t - \frac{T}{2}\right) + \ldots h_{2L} \cdot \varphi_1\left(t - (2L-1)\frac{T}{2}\right) \qquad (E37)$$

$$\forall k \begin{cases} z(2k+1) = c_m(k)h_1 + c_m(k-1)h_3 + \ldots + c_m(k-L+1)h_{2L-1} \\ z(2k+2) = c_m(k)h_2 + c_m(k-1)h_4 + \ldots + c_m(k-L+1)h_{2L} \end{cases} \qquad (E38)$$

$$Z_{L_1}(k) = \begin{bmatrix} z(2k+1) \\ z(2k+2) \\ \vdots \\ z(2k+2L_1-1) \\ z(2k+2L_1) \end{bmatrix} \qquad (E41)$$

$$\underset{(2L_1 \times 2L_1)}{M_{L_1}} = \sum_k Z_{L_2}(k) \cdot Z_{L_1}^*(k) \qquad (E42)$$

$$\underset{(2L \times 2L)}{M_L} = \sum_k Z_L(k) \cdot Z_L^*(k) \qquad (E43)$$

$$Z_L(k) = \begin{bmatrix} z(2k+1) \\ z(2k+2) \\ \vdots \\ z(2k+2L-1) \\ z(2k+2L) \end{bmatrix} \qquad (E44)$$

$$V = \begin{bmatrix} +h_{2L}^* \\ -h_{2L-1}^* \\ \vdots \\ +h_2^* \\ -h_1^* \end{bmatrix} \qquad (E45)$$

-continued $$\forall k z_{L_1 k}(t) = c_m(k-L+1) \cdot Z_1(t) + \quad (E47)$$
$$c_m(k-L+2) \cdot Z_2(t) +$$
$$\ldots +$$
$$c_m(k) \cdot Z_L(t) +$$
$$\ldots +$$
$$c_m(k+L_1) \cdot Z_{L+L_1-1}(t)$$

$$Z_1(t) = h_{pm}(t-(-L+1)T) \cdot \underset{[0,L_1 T[}{rect(t)} \quad (E48)$$

$$Z_2(t) = h_{pm}(t-(-L+2)T) \cdot \underset{[0,L_1 T[}{rect(t)}$$

$$\ldots$$

$$Z_L(t) = h_{pm}(t) \cdot \underset{[0,L_1 T[}{rect(t)}$$

$$\ldots$$

$$Z_{L+L_1-1}(t) = h_{pm}(t - L_1 T) \cdot \underset{[0,L_1 T[}{rect(t)}$$

$$\forall k \begin{cases} z(qk+1) = c_m(k)h_1 + c_m(k-1)h_{q+1} + \ldots c_m(k-L+1)h_{(q-1)L+1} \\ z(qk+2) = c_m(k)h_2 + c_m(k-1)h_{q+2} + \ldots c_m(k-L+1)h_{(q-1)L+2} \\ \ldots \\ z(qk+q) = c_m(k)h_q + c_m(k-1)h_{q+q} + \ldots c_m(k-L+1)h_{qL} \end{cases} \quad (E50)$$

$$Z_{L_1}(k) = \begin{bmatrix} z(qk+1) \\ \vdots \\ z(qk+qL_1) \end{bmatrix} \quad (E51)$$

$$\underset{(q \cdot L_1 \times q \cdot L_1)}{M_{L_i}} = \sum_k Z_{L_1}(k) \cdot Z_{L_1}^*(k) \quad (E52)$$

$$\underset{(q \cdot L_1 \times 1)}{V_i} = \begin{bmatrix} v_i(1) \\ \vdots \\ v_i(q \cdot L_1) \end{bmatrix} i \in (L_1 + L, \ldots, qL_1) \quad (E55)$$

$$\underset{(q \cdot L \times q \cdot (L_1+L)-1)}{P_i} = \begin{bmatrix} \begin{bmatrix} v_i(qL_1-q+1) \\ \vdots \\ v_i(qL_1) \end{bmatrix} & \begin{bmatrix} v_i(qL_1-2q+1) \\ \vdots \\ v_i(qL_1) \end{bmatrix} & \vdots & 0 & 0 \\ 0 & & & & \\ & & & \begin{bmatrix} v_i(1) \\ \vdots \\ v_i(qL_1-q) \end{bmatrix} & 0 \\ 0 & 0 & \vdots & & \begin{bmatrix} v_i(1) \\ \vdots \\ v_i(q) \end{bmatrix} \end{bmatrix} \quad (E56)$$

$$G = \sum_i P_i \cdot P_i^* \quad (E57)$$

$$\underset{(q \cdot L \times 1)}{h_{pm}} = \begin{bmatrix} h_1 \\ h_2 \\ \vdots \\ h_{q \cdot L} \end{bmatrix} \quad (E58)$$

$$\underset{(q \cdot L \times (2L-1))}{H} = \begin{bmatrix} h((L-1) \cdot q+1) & h((L-2) \cdot q+1) & \vdots & \vdots \\ \vdots & \vdots & \vdots & \vdots \\ h(L \cdot q) & h((L-1) \cdot q) & \vdots & \vdots \\ 0 & \vdots & \vdots & \vdots \\ \vdots & h(L \cdot q) & \vdots & \vdots \\ \vdots & \vdots & \vdots & h(1) \\ \vdots & \vdots & \vdots & \vdots \\ 0 & \vdots & \vdots & h(q) \end{bmatrix} \quad (E63)$$

$$\underset{[(2L-1) \times qL]}{(H^* \cdot H)^{-1} H^*} \quad (E64)$$

-continued $$E(a(k)a(k+p)^*) \approx \sum_k a(k)a(k+p)^* \begin{vmatrix} 1 & \text{for } p = 0 \\ 0 & \text{otherwise} \end{vmatrix} \quad \text{(E70)}$$

$$P(Z) = \sum_{i=0}^{N} \alpha_i Z^{-i} \quad \text{(E71)}$$

$$P_2(Z) = P(Z) \cdot P^*(Z) = \left(\sum_{i=0}^{N} \alpha_i Z^{-i}\right)\left(\sum_{j=0}^{N} \alpha_j^* Z^{+j}\right) \quad \text{(E72)}$$

$$Q(Z) = \sum_{r=-N}^{r=+N} \left(\sum_k [c_m(k)c_m^*(k+r)]\right) Z^{-r} \quad \text{(E73)}$$

$$P(Z) = K_1 \cdot \prod_{i=1}^{N} (1 - \beta_i Z^{-i}) \quad \text{(E75)}$$

$$P_2(Z) = K_1 \cdot K_1^* \prod_{i=1}^{N} (1 - \beta_i Z^{-i})(1 - \beta_i^* Z^{-i}) \quad \text{(E76)}$$

$$V = \frac{1}{nb} \sum_k \left[|a_m(k)| - \frac{1}{nb}\sum_k |a_m(k)|\right]^2 \quad \text{(E80)}$$

$$E = (a(k)a(k+p)^*) = \begin{vmatrix} \lambda_p & \text{arbitrary for } -e \leq p \leq e \quad (e \in \mathit{IN} \text{ and small}) \\ 0 & \text{otherwise} \end{vmatrix} \quad \text{(E81)}$$

with $e$ a not overly large integer $$d(x, y) = \frac{1}{kx} \sum_{k=j}^{kx} \frac{1}{\sigma} \frac{1}{\sqrt{2\Pi}} e^{-\frac{|x+jy-a(k)|^2}{2\sigma^2}} \quad \text{(E82)}$$

$\sigma$ is a constant whose value has been fixed by simulation $$d(x, y) = \frac{1}{nb} \sum_{k=1}^{nb} \frac{1}{\sigma} \frac{1}{\sqrt{2\Pi}} e^{-\frac{|x+jy-a(k)|^2}{2\sigma^2}} \quad \text{(E82)}$$

$$\int_{x,y} d^2(x, y) dx dy \quad \text{(E85)}$$

$$\int d_n(x, y) dx dy < \frac{1}{n-1}\left(\int d(x, y) dx dy - \int d_n(x, y) dx dy\right) \cdot \lambda \quad \text{(E86)}$$

$$e(k) = \underset{i}{\overset{\text{Min}}{e}}(\|a_{(k)} - e_i\|^2) \quad \text{(E87)}$$

$e_i \in \{e_1, e_2, \ldots\}$ set estimated at 900

$$\begin{cases} z(t) = \sum_k e_k g(t - kT) e^{j2\pi f_0 t} \\ (e_k) \text{ is the estimated symbol train} \\ \frac{1}{T} \text{ is the estimated tempo} \\ g(t) \equiv \left(\sum_i \alpha_i h_{pm}(t - iT) e^{j2\pi f_0 t}\right) \\ h_{pm} \text{ is the estimated function of smallest support} \\ (\alpha_i) \text{ is the estimated filtering residual} \\ f_0 = f_i + \Delta f_0 \text{ is the estimated carrier} \end{cases} \quad \text{(E91)}$$

$$\frac{1}{\frac{b}{2}} \int_a^{\frac{b}{2}T} \|r(t) - z(t)\|^2 dt \quad \text{(E92)}$$

The invention claimed is:

1. A device for aiding the analysis of signals containing a symbols-based digital modulation, said device comprising:

a signal memory for storing a complex digital signal (z(t)), representative in amplitude and phase of a captured signal, over a chosen duration, and processing means devised to search within the complex signal for the properties relating to its carrier frequency and to a modulation of the carrier frequency as a function of a chosen modulation model, wherein the processing means comprise:
means for determining an estimate of the tempo (1/T) of the modulation,
projection means devised to calculate the components (zp(t)) of the complex signal in a function basis, said function basis being parameterized according to said tempo (1/T) of the modulation, and
calculation means operating on these components, so as to determine at least one estimate relating to at least one property of the complex signal, within the group of properties comprising the elementary pulse shape (g(t)) of the complex signal, the string of symbols (a(k)) of the complex signal and the carrier (f0) of the complex signal.

2. A device according to claim 1, wherein the function basis is parameterized so as to exhibit at least two samples per period (T) of the modulation ($q \geq 2$).

3. A device according to claim 2, wherein the function basis comprises at least two functions ($\phi 1(t)$, ($\phi b(t)$) which are deduced from one another by a temporal translation of chosen period (T/2; T/q, $q \geq 2$).

4. A device according to claim 1, wherein the function basis comprises rectangular functions which are temporally adjacent to one another.

5. A device according to claim 1, wherein the function basis comprises functions of the "raised cosine" type.

6. A device according to claim 1, wherein the projection means comprise:
means defining a digital filter, having an impulse response substantially equal to one of the functions, this digital filter receiving the complex signal, and
sampling means for repeated digital sampling of the output of this filter at a chosen rate (2/T; q/T).

7. A device according to claim 1, wherein the processing means are effective to determine an approximate estimate fa of the carrier f0 of the complex signal, as well as to demodulate this complex signal through this estimate fa; and in that the projection means are effective to operate on the complex signal (z(t)) after demodulation thereof through this approximate estimate, while the function basis is of low frequency, like the spectrum of the complex signal after demodulation.

8. A device according to claim 1, wherein the calculation means comprise means of matrix calculation on the components.

9. A device according to claim 1, wherein the calculation means are effective to calculate an estimate of the modulated elementary pulse shape (gm(t)) in the form of a function of minimal support.

10. A device according to claim 9, wherein the calculation means for calculating an estimate of the modulated elementary pulse shape are effective to search for the pulse shape in the form of a function of minimal support, comprising a pulse shape of minimal support (hpm(t)), and a symbol train (cm(k)) associated with the pulse shape of minimal support.

11. A device according to claim 10, wherein the calculation means are devised so as to determine a representation of a subspace of minimal dimension of the function space, which subspace contains the complex signal, and to search within this subspace for a direction orthogonal to each of the slices of the complex signal, the components of the eigenvector (V) associated with this direction being representative of the pulse shape of minimal support.

12. A device according to claim 10, wherein the calculation means are effective to furthermore determine the symbol train (cm(k)) associated with the pulse shape of minimal support.

13. A device according to claim 11, wherein the calculation means comprise:
means for effecting an inverse filtering of the said pulse shape of minimal support, then for applying this inverse filtering to the components of the complex signal in the function basis, and
means for effecting polynomial resolution on the result of this inverse filtering, including means for selecting a set of solutions (am(k)) meeting chosen constraints.

14. A device according to claim 13, wherein the chosen constraints are the decorrelation of the symbols and the minimization of the variance of the modulus of the symbols.

15. A device according to claim 10, wherein the calculation means are devised so as to determine a correction ($\Delta f0$) of the initial estimation (fa) of the carrier, by searching for a frequency of demodulation of the residual which leads to a probability density with minimum entropy.

16. A device according to claim 15, wherein the calculation means are devised so as to produce a representation of the demodulated complex signal through corrected carrier estimation, with the pulse shape of minimal support.

17. A device according to claim 16, further comprising means for calculating an estimate of the entire set of possible states (ei) of the symbols in the complex signal.

18. A device according to claim 17, wherein the means for calculating an estimate of the entire set of possible states of the symbols in the complex signal operate by searching for local maxima of the probability density of the symbols.

19. A device according to claim 18, wherein it comprises means for calculating an estimate of the symbol train (a(k)) actually present in the complex signal, by searching, in respect of each symbol taken individually, for the possible state which is closest.

20. A device according to claim 19, further comprising means for locally reconstructing a signal having the carrier, the modulation and the symbols estimated, and for comparing this local signal with the initial signal, as stored.

21. A device according to claim 1, wherein the function basis is associated with the entire set of linear digital modulations.

* * * * *